US012621841B2

(12) United States Patent
Liu et al.

(10) Patent No.: US 12,621,841 B2
(45) Date of Patent: May 5, 2026

(54) REFERENCE SIGNAL SENDING METHOD AND COMMUNICATION APPARATUS

(71) Applicant: HUAWEI TECHNOLOGIES CO., LTD., Shenzhen (CN)

(72) Inventors: Xiaoqing Liu, Beijing (CN); Yongping Zhang, Beijing (CN); Zheng Yu, Beijing (CN); Tie Li, Beijing (CN); Leiming Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 432 days.

(21) Appl. No.: 18/177,001

(22) Filed: Mar. 1, 2023

(65) Prior Publication Data

US 2023/0209571 A1 Jun. 29, 2023

Related U.S. Application Data

(63) Continuation of application No. PCT/CN2020/112909, filed on Sep. 1, 2020.

(51) Int. Cl.
*H04L 5/00* (2006.01)
*H04W 72/232* (2023.01)

(52) U.S. Cl.
CPC ......... *H04W 72/232* (2023.01); *H04L 5/0048* (2013.01)

(58) Field of Classification Search
CPC ... H04L 5/0048; H04L 5/0023; H04L 5/0053; H04L 5/0078; H04L 5/0094; H04W 72/232
See application file for complete search history.

(56) References Cited

U.S. PATENT DOCUMENTS

2020/0045696 A1* 2/2020 Huang .................. H04L 5/0007
2020/0053767 A1* 2/2020 Bai ....................... H04W 72/23
(Continued)

FOREIGN PATENT DOCUMENTS

CN 108616345 A 10/2018
CN 108933648 A 12/2018
(Continued)

OTHER PUBLICATIONS

"Enhancements on SRS flexibility, coverage and capacity," 3GPP TSG RAN WG1 #102, e-Meeting, R1-2005622, total 5 pages, 3GPP—3rd Generation Partnership Project, Valbonne, France (Aug. 17-28, 2020).

(Continued)

*Primary Examiner* — Andrew Lee
(74) *Attorney, Agent, or Firm* — Leydig, Voit & Mayer, Ltd.

(57) ABSTRACT

A reference signal (RS) sending method and a communication apparatus are provided, which may be applied to a scenario in which an RS is sent based on aperiodic time-domain behavior. The method includes: a terminal device obtains downlink control information (DCI); determines first time information based on the DCI; determines, based on the first time information and a time unit in which the DCI is located, a time unit for sending an RS; and sends the RS in the determined time unit for sending the RS. Correspondingly, a network device determines the first time information based on the DCI; determines, based on the first time information and the time unit in which the DCI is located, a time unit for receiving the RS; and receives the RS in the determined time unit for receiving the RS.

16 Claims, 5 Drawing Sheets

(56) References Cited

U.S. PATENT DOCUMENTS

| | | | | |
|---|---|---|---|---|
| 2021/0212101 | A1* | 7/2021 | Jiang | H04W 72/535 |
| 2022/0240187 | A1* | 7/2022 | Guo | H04W 76/30 |
| 2022/0330300 | A1* | 10/2022 | Wang | H04L 5/0094 |
| 2023/0140402 | A1* | 5/2023 | Chou | H04L 5/0048 370/329 |
| 2023/0147579 | A1* | 5/2023 | Go | H04L 1/08 370/329 |
| 2023/0232343 | A1* | 7/2023 | Gao | H04L 5/0096 370/318 |
| 2023/0291523 | A1* | 9/2023 | Hasegawa | H04L 5/0094 |
| 2024/0014971 | A1* | 1/2024 | Zheng | H04L 5/0053 |

FOREIGN PATENT DOCUMENTS

| | | | |
|---|---|---|---|
| CN | 110139375 | A | 8/2019 |
| CN | 110650001 | A | 1/2020 |
| WO | 2019140666 | A1 | 7/2019 |
| WO | 2019159024 | A1 | 8/2019 |
| WO | 2019214406 | A1 | 11/2019 |
| WO | 2020140967 | A1 | 7/2020 |
| WO | 2020156174 | A1 | 8/2020 |

OTHER PUBLICATIONS

"Views on discovery signal-based RRM measurement procedures," 3GPP TSG RAN WG1 Meeting #78, Dresden, Germany, R1-143216, total 6 pages, 3GPP—3rd Generation Partnership Project, Valbonne, France (Aug. 18-22, 2014).

MediaTek Inc., "Enhancements on SRS Flexibility, Coverage and Capacity," 3GPP TSG RAN WG1 #102, e-Meeting, R1-2005622, total 5 pages, 3rd Generation Partnership Project, Valbonne, France (Aug. 17-28, 2020).

"3rd Generation Partnership Project; Technical Specification Group Radio Access Network; NR; Multiplexing and channel coding (Release 16)," 3GPP TS 38.212 V16.2.0, Total 151 pages, 3rd Generation Partnership Project, Valbonne, France (Jun. 2020).

"3rd Generation Partnership Project; Technical Specification Group Radio Access Network; NR;Physical layer procedures for data(Release 16)," 3GPP TS 38.214 V16.2.0, Total 163 pages, 3rd Generation Partnership Project, Valbonne, France (Jun. 2020).

"3rd Generation Partnership Project; Technical Specification Group Radio Access Network; NR; Radio Resource Control (RRC) protocol specification (Release 16)," 3GPP TS 38.331 V16.1.0, Total 911 pages, 3rd Generation Partnership Project, Valbonne, France (Jul. 2020).

ZTE, "Preliminary views on further enhancement for NR MIMO," 3GPP TSG RAN WG1 Meeting #101-e, e-Meeting, R1-2003483, Total 18 pages, 3rd Generation Partnership Project, Valbonne, France (May 25-Jun. 5, 2020).

Huawei et al,. "Enhancements on SRS for Rel-17," 3GPP TSG RAN WG1 Meeting #102-e, E-meeting, R1-2005247, Total 9 pages, 3rd Generation Partnership Project, Valbonne, France (Aug. 17-28, 2020).

Vivo, "Discussion on SRS enhancement," 3GPP TSG RAN WG1 #102-e, e-Meeting, R1-2005368, Total 17 pages, 3rd Generation Partnership Project, Valbonne, France (Aug. 17-28, 2020).

Interdigital, Inc., "Discussion on SRS Enhancements," 3GPP TSG RAN WG1 #102-e, e-Meeting, R1-2005487, Total 5 pages, 3rd Generation Partnership Project, Valbonne, France (Aug. 17-28, 2020).

CATT, "Discussion on enhancements on SRS flexibility, coverage and capacity," 3GPP TSG RAN WG1 #102-e, e-Meeting, R1-2005688, Total 6 pages, 3rd Generation Partnership Project, Valbonne, France (Aug. 17-28, 2020).

Qualcomm Incorporated, "Discussion of the LS about cancelled ACK for MAC deactivation," 3GPP TSG RAN WG1 #102-e, e-Meeting, R1-2006759, Total 6 pages, 3rd Generation Partnership Project, Valbonne, France (Aug. 17-28, 2020).

* cited by examiner

First field

First time information

Used to determine an SRS

First field

Jointly indicate first time
information and an SRS

First field

Jointly indicate first time
information and an SRS

First field

Indicate an SRS n bits that indicate
first time information

SRS request field

Indicate
supplementary uplink
information or non-
supplementary uplink
information Jointly indicate first time
information and an SRS

REFERENCE SIGNAL SENDING METHOD AND COMMUNICATION APPARATUS

CROSS-REFERENCE TO RELATED APPLICATIONS

This application is a continuation of International Application No. PCT/CN2020/112909, filed on Sep. 1, 2020, the disclosure of which is hereby incorporated by reference in its entirety.

TECHNICAL FIELD

Embodiments of this application relate to the field of communication technologies, and specifically, to a reference signal sending method and a communication apparatus.

BACKGROUND

The fifth-generation wireless access system standard new radio (NR) is based on a multiple-input multiple-output (MIMO) system. A network device may configure a terminal device to send a sounding reference signal (SRS). The SRS can support codebook-based uplink transmission, non-codebook-based uplink transmission, beam management, and antenna switching. From a perspective of time-domain behavior, SRSs may be classified into a periodic sounding reference signal (P-SRS), a semi-persistent sounding reference signal (SP-SRS), and an aperiodic sounding reference signal (AP-SRS).

For the periodic SRS, the network device may configure a periodicity and an offset for the SRS, and the terminal device may periodically send the SRS based on the configured periodicity and offset. For the semi-persistent SRS, the network device may configure a periodicity and an offset for the SRS, and send an activation command or a deactivation command to the terminal device by using a media access control control element (MAC CE). When receiving the activation command, the terminal device may periodically send the SRS based on the configured periodicity and offset. If receiving the deactivation command later, the terminal device stops sending the SRS. For the aperiodic SRS, the network device triggers, based on downlink control information (DCI), the terminal device to send the SRS. The terminal device receives the DCI in a slot n, determines, based on an offset defined by a higher layer parameter and the slot n, a slot for sending the SRS, and sends the SRS in the determined slot.

Currently; in an aperiodic SRS sending process, there are disadvantages of inflexible sending, a low sending success rate, and physical downlink control channel (PDCCH) congestion.

SUMMARY

Embodiments of this application provide a reference signal (RS) sending method and a communication apparatus, to help improve flexibility of RS triggering, improve an RS sending success rate, and reduce a probability of PDCCH congestion.

According to a first aspect, embodiments of this application provide a reference signal (RS) sending method. The method may be performed by a terminal device, or may be performed by a chip disposed in a terminal device. This is not limited in embodiments of this application.

The method includes: A terminal device obtains downlink control information (DCI): determines first time information based on the DCI: determines, based on the first time information and a time unit in which the DCI is located, a time unit for sending an RS; and sends the RS in the determined time unit for sending the RS.

It can be learned that a time for sending the RS is dynamically indicated based on the downlink control information DCI, so that the time for sending the RS is more flexible, an RS scheduling capacity is increased, and a probability of PDCCH congestion is reduced.

With reference to the first aspect, in some possible implementations, the DCI includes a first field, the first field is used to determine the first time information, and at least two bit states in bit states corresponding to the first field are associated with a same aperiodic RS resource triggering state.

With reference to the first aspect, in some possible implementations, a field length of the first field is N bits, n bits in the N bits are used to determine the first time information, and bits in the N bits other than the n bits are used to determine the RS, where 1≤n≤N, and N is a positive integer.

It can be learned that the n bits in the first bit indicate the first time information, and the remaining bits indicate the RS, so that the flexibility of RS triggering is improved.

With reference to the first aspect, in some possible implementations, a field length of the first field is m bits, the m bits are used to determine the first time information and are used to determine the RS, m is an odd number greater than or equal to 3, and $(2^m-2)/3$ bit states in $2^m$ bit states corresponding to the first field are associated with the same aperiodic RS resource triggering state.

With reference to the first aspect, in some possible implementations, a field length of the first field is m bits, the m bits are used to determine the first time information and are used to determine the RS, m is an even number greater than or equal to 4, and $(2^m-1)/3$ bit states in $2^m$ bit states corresponding to the first field are associated with the same aperiodic RS resource triggering state.

It can be learned that the first field in the DCI indicates both the first time information and the RS, so that the flexibility of RS triggering is improved without increasing DCI overheads.

With reference to the first aspect, in some possible implementations, a field length of the first field is K bits; when k bits in the K bits indicate supplementary uplink information or non-supplementary uplink information, bits in the K bits other than the k bits are used to determine the first time information and/or determine the RS; and when no bit that indicates supplementary uplink information or non-supplementary uplink information exists in the K bits, the K bits are used to determine the first time information and/or determine the RS, where 1≤k≤K and K is a positive integer.

It can be learned that a length of a field indicating RS sending in DCI in which supplementary uplink information is configured is the same as a field indicating RS sending in DCI in which no supplementary uplink information is configured, so that processing complexity of the terminal device is reduced.

With reference to the first aspect, in some possible implementations, the first time information is included in a first value set, and the first value set is a set configured by using first higher layer configuration information or is a predefined set.

It can be learned that a plurality of first values are configured by using the first higher layer configuration information or are predefined, so that flexibility of indicating the time for sending the RS can be improved, the RS scheduling capacity is increased, and the probability of PDCCH congestion is reduced.

With reference to the first aspect, in some possible implementations, the first field indicates second time information, the second time information and a first time offset are used to determine the first time information, the second time information is included in a second value set, the second value set is a set configured by using second higher layer configuration information or is a predefined set, and the first time offset is configured by using third higher layer configuration information or is predefined.

It can be learned that the first time offset is configured by using the third higher layer configuration information, and a plurality of second values are configured by using the second higher layer configuration information. The terminal device may determine the first time information based on a second value indicated in the first field and the first time offset. This effectively reduces overheads of higher layer signaling while ensuring the flexibility of the time for sending the RS.

With reference to the first aspect, in some possible implementations, the DCI includes an RS request field and a time indication field, the time indication field and a first time offset are used to determine the first time information, a value indicated in the time indication field is included in a second value set, the second value set is a set configured by using second higher layer configuration information or is a predefined set, and the first time offset is configured by using third higher layer configuration information or is predefined.

It can be learned that the time for sending the RS is determined based on a second value indicated in the time indication field and the first time offset configured by using the third higher layer configuration information, so that overheads of higher layer signaling is effectively reduced, and the flexibility of the time for sending the RS is ensured.

With reference to the first aspect, in some possible implementations, a value of at least one element in the second value set is greater than −4 and less than 5: or a value of at least one element in the second value set is greater than 0 and less than 7: or the second value set is related to slot format information.

With reference to the first aspect, in some possible implementations, a field length of the first field is m bits, and m is an odd number greater than or equal to 3; when a bit state corresponding to the first field is not a specific value, a resource quantity of the RS is a first quantity; and when the bit state corresponding to the first field is the specific value or the terminal device receives an RS resource information switching indication, the resource quantity of the RS is a second quantity.

With reference to the first aspect, in some possible implementations, whether the resource quantity of the RS is the first quantity or the second quantity is configured by using fourth higher layer configuration information or is predefined.

It can be learned that the resource quantity of the RS is switched based on the specific value indicated in the DCI, so that configuration flexibility of the RS is improved, and accuracy of downlink channel information measurement is ensured or power consumption of the terminal device is reduced.

With reference to the first aspect, in some possible implementations, a field length of the first field is m bits, and m is an odd number greater than or equal to 3; when a bit state corresponding to the first field is not a specific value, a port quantity of the RS is a third quantity; and when the bit state corresponding to the first field is the specific value or the terminal device receives an RS port information switching indication, the port quantity of the RS is a fourth quantity:

With reference to the first aspect, in some possible implementations, whether the port quantity of the RS is the third quantity or the fourth quantity is configured by using fifth higher layer configuration information or is predefined.

It can be learned that the antenna port quantity of the RS is switched based on the specific value indicated in the DCI, so that configuration flexibility of the RS for performing an antenna switching function is improved, and accuracy of downlink channel information measurement is ensured or power consumption of the terminal device is reduced.

According to a second aspect, embodiments of this application provide a reference signal RS sending method. The method may be performed by a network device, or may be performed by a chip disposed in a network device. This is not limited in embodiments of this application.

The method includes: A network device determines first time information based on downlink control information DCI: determines, based on the first time information and a time unit in which the DCI is located, a time unit for receiving an RS; and receives the RS in the determined time unit for receiving the RS.

It can be learned that a time for receiving the RS is dynamically indicated based on the downlink control information DCI, so that the time for receiving the RS is more flexible, an RS scheduling capacity is increased, and a probability of PDCCH congestion is reduced.

With reference to the second aspect, in some possible implementations, the DCI includes a first field, the first field is used to determine the first time information, and at least two bit states in bit states corresponding to the first field are associated with a same aperiodic RS resource triggering state.

With reference to the second aspect, in some possible implementations, a field length of the first field is N bits, n bits in the N bits are used to determine the first time information, and bits in the N bits other than the n bits are used to determine the RS, where 1≤n≤N, and N is a positive integer.

With reference to the second aspect, in some possible implementations, a field length of the first field is m bits, the m bits are used to determine the first time information and are used to determine the RS, m is an odd number greater than or equal to 3, and $(2^m-2)/3$ bit states in $2^m$ bit states corresponding to the first field are associated with the same aperiodic RS resource triggering state.

With reference to the second aspect, in some possible implementations, a field length of the first field is m bits, the m bits are used to determine the first time information and are used to determine the RS, m is an even number greater than or equal to 4, and $(2^m-1)/3$ bit states in $2^m$ bit states corresponding to the first field are associated with the same aperiodic RS resource triggering state.

It can be learned that the first field in the DCI indicates both the first time information and the RS, so that the flexibility of RS triggering is improved without increasing DCI overheads.

With reference to the second aspect, in some possible implementations, a field length of the first field is K bits; when k bits in the K bits indicate supplementary uplink information or non-supplementary uplink information, bits in the K bits other than the k bits are used to determine the first time information and/or determine the RS; and when no bit that indicates supplementary uplink information or non-supplementary uplink information exists in the K bits, the K bits are used to determine the first time information and/or determine the RS, where 1≤k≤K and K is a positive integer.

It can be learned that a length of a field indicating RS sending in DCI in which supplementary uplink information is configured is the same as a field indicating RS sending in DCI in which no supplementary uplink information is configured, so that processing complexity of the terminal device is reduced.

With reference to the second aspect, in some possible implementations, the first time information is included in a first value set, and the first value set is a set configured by using first higher layer configuration information or is a predefined set.

It can be learned that a plurality of first values are configured by using the first higher layer configuration information or are predefined, so that flexibility of indicating the time for sending the RS can be improved, the RS scheduling capacity is increased, and the probability of PDCCH congestion is reduced.

With reference to the second aspect, in some possible implementations, the first field indicates second time information, the second time information and a first time offset are used to determine the first time information, the second time information is included in a second value set, the second value set is a set configured by using second higher layer configuration information or is a predefined set, and the first time offset is configured by using third higher layer configuration information or is predefined.

It can be learned that the first time offset is configured by using the third higher layer configuration information, and a plurality of second values are configured by using the second higher layer configuration information. The terminal device may determine the first time information based on a second value indicated in the first field and the first time offset. This effectively reduces overheads of higher layer signaling while ensuring the flexibility of the time for sending the RS.

With reference to the second aspect, in some possible implementations, the DCI includes an RS request field and a time indication field, the time indication field and a first time offset are used to determine the first time information, a value indicated in the time indication field is included in a second value set, the second value set is a set configured by using second higher layer configuration information or is a predefined set, and the first time offset is configured by using third higher layer configuration information or is predefined.

It can be learned that the time for sending the RS is determined based on a second value indicated in the time indication field and the first time offset configured by using the third higher layer configuration information, so that overheads of higher layer signaling is effectively reduced and the flexibility of the time for sending the RS is ensured.

With reference to the second aspect, in some possible implementations, a value of at least one element in the second value set is greater than −4 and less than 5; or a value of at least one element in the second value set is greater than 0 and less than 7; or the second value set is related to slot format information.

With reference to the second aspect, in some possible implementations, a field length of the first field is m bits, and m is an odd number greater than or equal to 3; when a bit state corresponding to the first field is not a specific value, a resource quantity of the RS is a first quantity; and when the bit state corresponding to the first field is the specific value or the terminal device receives an RS resource information switching indication, the resource quantity of the RS is a second quantity.

With reference to the second aspect, in some possible implementations, whether the resource quantity of the RS is the first quantity or the second quantity is configured by using fourth higher layer configuration information or is predefined.

It can be learned that the resource quantity of the RS is switched based on the specific value indicated in the DCI, so that configuration flexibility of the RS is improved, and accuracy of downlink channel information measurement is ensured or power consumption of the terminal device is reduced.

With reference to the second aspect, in some possible implementations, a field length of the first field is m bits, and m is an odd number greater than or equal to 3; when a bit state corresponding to the first field is not a specific value, a port quantity of the RS is a third quantity; and when the bit state corresponding to the first field is the specific value or the terminal device receives an RS port information switching indication, the port quantity of the RS is a fourth quantity:

With reference to the second aspect, in some possible implementations, whether the port quantity of the RS is the third quantity or the fourth quantity is configured by using fifth higher layer configuration information or is predefined.

It can be learned that the antenna port quantity of the RS is switched based on the specific value indicated in the DCI, so that configuration flexibility of the RS for performing an antenna switching function is improved, and accuracy of downlink channel information measurement is ensured or power consumption of the terminal device is reduced.

According to a third aspect, embodiments of this application further provides a communication apparatus. The communication apparatus has some or all functions of implementing the terminal device according to the first aspect. For example, the apparatus may have functions in some or all embodiments of the terminal device in this application, or may have a function of independently implementing any embodiment of this application. The function may be implemented through hardware, or may be implemented through hardware executing corresponding software. The hardware or the software includes one or more units or modules corresponding to the functions.

In a possible design, a structure of the communication apparatus may include a processing unit and a communication unit. The processing unit is configured to support the communication apparatus in performing a corresponding function in the foregoing method. The communication unit is configured to support communication between the communication apparatus and another device. The communication apparatus may further include a storage unit. The storage unit is configured to be coupled to the processing unit and the communication unit, and stores program instructions and data that are necessary for the communication apparatus.

In an implementation, the communication apparatus includes:

- a processing unit, configured to obtain downlink control information DCI, determine first time information based on the DCI, and determine, based on the first time information and a time unit in which the DCI is located, a time unit for sending an RS; and
- a communication unit, configured to send the RS in the determined time for sending the RS.

For related content of this implementation, refer to the related content of the first aspect. Details are not described herein again.

In another implementation, the communication apparatus may include:

a processor, configured to obtain downlink control information DCI, determine first time information based on the DCI, and determine, based on the first time information and a time unit in which the DCI is located, a time unit for sending an RS; and a transceiver, configured to send the RS in the determined time for sending the RS.

For related content of this implementation, refer to the related content of the first aspect. Details are not described herein again.

In an implementation process, the processor may be configured to perform, for example, but not limited to, baseband related processing; and the transceiver may be configured to perform, for example, but not limited to, radio frequency receiving and sending. The foregoing components may be separately disposed on chips that are independent of each other, or at least some or all of the components may be disposed on a same chip. For example, the processor may be further divided into an analog baseband processor and a digital baseband processor. The analog baseband processor and the transceiver may be integrated on a same chip, and the digital baseband processor may be disposed on an independent chip. With continuous development of integrated circuit technologies, an increasing quantity of components may be integrated onto a same chip. For example, the digital baseband processor and a plurality of application processors (including but not limited to a graphics processing unit, a multimedia processor, and the like) may be integrated onto a same chip. Such a chip may be referred to as a system on chip. Whether the components are separately disposed on different chips or integrated and disposed on one or more chips usually depends on a requirement of a product design. Implementation forms of the foregoing components are not limited in embodiments of this application.

According to a fourth aspect, embodiments of this application further provide a communication apparatus. The communication apparatus has some or all of functions of implementing the network device in the method example in the second aspect. For example, the communication apparatus may include functions in some or all embodiments of this application, or may include a function of separately implementing any embodiment of this application. The function may be implemented through hardware, or may be implemented through hardware executing corresponding software. The hardware or the software includes one or more units or modules corresponding to the functions.

In a possible design, a structure of the communication apparatus may include a processing unit and a communication unit. The processing unit is configured to support the communication apparatus in performing a corresponding function in the foregoing method. The communication unit is configured to support communication between the communication apparatus and another device. The communication apparatus may further include a storage unit. The storage unit is configured to be coupled to the processing unit and a sending unit, and stores program instructions and data that are necessary for the communication apparatus.

In an implementation, the communication apparatus includes:

a processing unit, configured to determine first time information based on downlink control information DCI, and determine, based on the first time information and a time unit in which the DCI is located, a time unit for receiving an RS; and a communication unit, configured to receive the RS in the determined time unit for receiving the RS.

For related content of this implementation, refer to the related content of the second aspect. Details are not described herein again.

In an example, the processing unit may be a processor, the communication unit may be a transceiver or a communication interface, and the storage unit may be a memory.

In another implementation, the communication apparatus includes:

a processor, configured to determine first time information based on downlink control information DCI, and determine, based on the first time information and a time unit in which the DCI is located, a time unit for receiving an RS; and a transceiver, configured to receive the RS in the determined time unit for receiving the RS.

For related content of this implementation, refer to the related content of the second aspect. Details are not described herein again.

In an implementation process, the processor may be configured to perform, for example, but not limited to, baseband related processing; and the transceiver may be configured to perform, for example, but not limited to, radio frequency receiving and sending. The foregoing components may be separately disposed on chips that are independent of each other, or at least some or all of the components may be disposed on a same chip. For example, the processor may be further divided into an analog baseband processor and a digital baseband processor. The analog baseband processor and the transceiver may be integrated on a same chip, and the digital baseband processor may be disposed on an independent chip. With continuous development of integrated circuit technologies, an increasing quantity of components may be integrated onto a same chip. For example, the digital baseband processor and a plurality of application processors (including but not limited to a graphics processing unit, a multimedia processor, and the like) may be integrated onto a same chip. Such a chip may be referred to as a system on chip. Whether the components are separately disposed on different chips or integrated and disposed on one or more chips usually depends on a requirement of a product design. Implementation forms of the foregoing components are not limited in embodiments of this application.

According to a fifth aspect, embodiments of this application further provide a processor, configured to perform the foregoing methods. In a process of performing these methods, a process of sending the information and a process of receiving the information in the foregoing methods may be understood as a process of outputting the information by the processor and a process of receiving the input information by the processor. When outputting the information, the processor outputs the information to a transceiver, so that the transceiver transmits the information. After the information is output by the processor, other processing may further need to be performed on the information before the information arrives at the transceiver. Similarly, when the processor receives the foregoing input information, the transceiver receives the information, and inputs the information into the processor. Further, after the transceiver receives the information, other processing may need to be performed on the information before the information is input into the processor.

Based on the foregoing principle, for example, sending the RS in the foregoing method may be understood as outputting the RS by the processor. For another example, receiving the RS may be understood as receiving the input RS by the processor.

Unless otherwise specified, operations such as transmission, sending, and receiving related to the processor may be more generally understood as operations such as output, receiving, and input of the processor, not transmission, sending, and receiving operations directly performed by a radio frequency circuit and an antenna, if the operations do not conflict with actual functions or internal logic of the operations in related descriptions.

In an implementation process, the processor may be a processor specially configured to perform these methods, or a processor, for example, a general-purpose processor, that executes computer instructions in a memory to perform these methods. The memory may be a non-transitory memory, for example, a read-only memory (ROM). The memory and the processor may be integrated into a same chip, or may be separately disposed on different chips. A type of the memory and a manner of disposing the memory and the processor are not limited in embodiments of this application.

According to a sixth aspect, embodiments of this application further provide a communication system. The system includes at least one terminal device and at least one network device in the foregoing aspects. In another possible design, the system may further include another device that interacts with the terminal device or the network device in the solutions provided in embodiments of this application.

According to a seventh aspect, embodiments of this application provide a computer-readable storage medium, configured to store computer software instructions. When the instructions are executed by a computer, the method in the first aspect is implemented.

According to an eighth aspect, embodiments of this application provide a computer-readable storage medium, configured to store computer software instructions. When the instructions are executed by a computer, a communication apparatus is enabled to implement the method in the second aspect.

According to a ninth aspect, embodiments of this application further provide a computer program product including instructions. When the computer program product runs on a computer, the computer is enabled to perform the method in the first aspect.

According to a tenth aspect, embodiments of this application further provide a computer program product including instructions. When the computer program product runs on a computer, the computer is enabled to perform the method in the second aspect.

According to an eleventh aspect, embodiments of this application provide a chip system. The chip system includes a processor and an interface. The interface is configured to obtain a program or instructions. The processor is configured to invoke the program or the instructions to implement or support a terminal device in implementing a function in the first aspect, for example, determining or processing at least one of data and information in the foregoing method.

In a possible design, the chip system further includes a memory. The memory is configured to store program instructions and data that are necessary for the terminal device. The chip system may include a chip, or may include a chip and another discrete device.

According to a twelfth aspect, embodiments of this application provide a chip system. The chip system includes a processor and an interface. The interface is configured to obtain a program or instructions. The processor is configured to invoke the program or the instructions to implement or support a network device in implementing a function in the second aspect, for example, determining or processing at least one of data and information in the foregoing method.

In a possible design, the chip system further includes a memory. The memory is configured to store program instructions and data that are necessary for the network device. The chip system may include a chip, or may include a chip and another discrete device.

DESCRIPTION OF EMBODIMENTS

Figure 1:
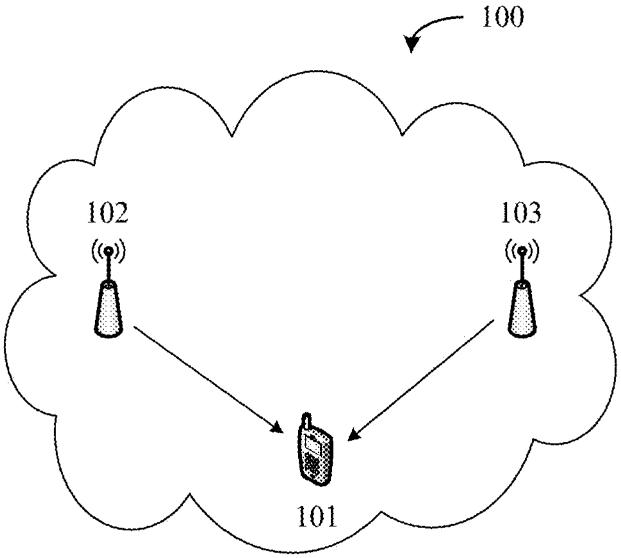
FIG. 1 is a schematic diagram of a communication system to which an embodiment of this application is applied.

The following describes technical solutions of embodiments of this application with reference to the accompanying drawings.

Technical solutions in embodiments of this application may be applied to various communication systems, for example, a long term evolution (LTE) system, an LTE frequency division duplex (FDD) system, an LTE time division duplex (TDD) system, and a universal mobile telecommunication system (UMTS). With continuous development of communication systems, the technical solutions in embodiments of this application may be further applied to a future network, for example, a 5th generation (5G) system or a new radio (NR) system; or may be further applied to a device to device (D2D) system, a machine to machine (M2M) system, or the like.

It should be understood that a network device in the communication system may be any device having a wireless transceiver function or a chip that can be disposed in the device. The device includes but is not limited to: an evolved NodeB (eNB), a radio network controller (RNC), a NodeB (NB), a base station controller (BSC), a base transceiver station (BTS), a home base station (for example, a Home evolved NodeB, or a Home NodeB, HNB), a baseband unit (BBU), or an access point (AP), a wireless relay node, a wireless backhaul node, a transmission point (TP), a transmission reception point (TRP), or the like in a wireless fidelity (Wi-Fi) system: or may be a device used in a 5G, 6G, or even 7G system, such as a gNB or a transmission point (TRP or TP) in an NR system, or one or a group of antenna panels (including a plurality of antenna panels) of a base station in the 5G system: or may be a network node that forms a gNB or a transmission point, for example, a baseband unit (BBU), a distributed unit (DU), a picocell, a femtocell, or a roadside unit (RSU) in a vehicle to everything (V2X) or intelligent driving scenario.

In some deployments, the gNB may include a central unit (CU) and a DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer finally becomes information at the PHY layer, or is converted from information at the PHY layer. Therefore, in this architecture, higher layer signaling such as RRC layer signaling or PHCP layer signaling may also be considered to be sent by the DU, or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

In embodiments disclosed in this application, an apparatus configured to implement network device functions may be a network device, or may be an apparatus that can support a network device in implementing the functions, for example, a chip system. The apparatus may be installed in the network device.

In embodiments disclosed in this application, technical solutions provided in embodiments disclosed in this application are described by using an example in which the apparatus configured to implement the network device functions is a network device and the network device is a base station.

It should be further understood that a terminal device in the communication system may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device in embodiments of this application may be a mobile phone, a tablet computer (Pad), a computer with a wireless transceiver function, a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, a wireless terminal in the foregoing V2X vehicle to everything scenario, an RSU of a wireless terminal type, or the like. Application scenarios are not limited in embodiments of this application.

In addition, to facilitate understanding of embodiments of this application, the following several descriptions are provided.

First, in embodiments of this application, for ease of description, when numbering is involved, consecutive numbers starting from 0 may be assigned. For example, symbol 0 in a slot may be a starting symbol in the slot. Certainly, specific implementations are not limited thereto. For example, consecutive numbers starting from 1 may be assigned. For example, symbol 1 in a slot may be a starting symbol in the slot. A number corresponding to a same symbol in a slot varies with a start value of numbering.

It should be understood that the foregoing descriptions are all provided to help describe technical solutions provided in embodiments of this application, but are not intended to limit the scope of this application.

Second, in the following embodiments, for a technical feature, technical features in the technical feature are distinguished by using "first", "second", "third", and the like, and the technical features described by "first", "second", and "third" are not in chronological or value order.

Third, "at least one" means one or more, and "a plurality of" means two or more. The term "and/or" describes an association relationship for describing associated objects and represents that three relationships may exist. For example, "A and/or B" may represent the following cases: Only A exists, both A and B exist, and only B exists, where A and B may be singular or plural. The character "/" usually indicates an "or" relationship between associated objects. "At least one of the following items (pieces)" or similar expressions refer to any combination of these items, including any combination of singular items (pieces) or plural items (pieces). For example, at least one of a, b, and c may represent a, or b, or c, or a and b, or a and c, or b and c, or a, b, and c. There may be one or more a, b, and c.

Fourth, in the following embodiments, some scenarios are described by using an NR network as an example of a wireless communication network. It should be noted that solutions in embodiments disclosed in this application may be further applied to another wireless communication network, and a corresponding name may be replaced with a name of a corresponding function in the another wireless communication network.

Fifth, embodiments disclosed in this application present aspects, embodiments, or features of this application with reference to a system including a plurality of devices, components, modules, and the like. It should be appreciated and understood that each system may include another device, component, module, and the like, and/or may not include all devices, components, modules, and the like discussed with reference to the accompanying drawings. In addition, a combination of these solutions may be used.

Sixth, in embodiments disclosed in this application, "of", "relevant", and "corresponding" may be mixed sometimes. It should be noted that meanings to be expressed by "of", "relevant", and "corresponding" are consistent when a difference between them is not emphasized.

For ease of understanding embodiments of this application, the following uses a communication system shown in FIG. 1 as an example to describe in detail a communication system applicable to a reference signal sending method provided in embodiments of this application. FIG. 1 is a schematic diagram of a communication system 100 to which embodiments of this application are applied. As shown in the figure, the communication system 100 may include at least one terminal device, for example, a terminal device 101 shown in the figure. The communication system 100 may further include at least one network device, for example, a network device #1 102 or a network device #2 103 shown in the figure.

When the terminal device communicates with the network device, the terminal device may obtain a higher layer parameter based on RRC signaling sent by the network device, and may obtain configuration information of a reference signal based on the higher layer parameter. The configuration information includes, but is not limited to, resource triggering configuration information, time offset configuration information, resource mapping configuration information, and the like. The terminal device may further receive downlink control information from the network device, determine first time information based on the received downlink control information, and determine, based on the first time information and a time unit in which the downlink control information is located, a time unit for sending the reference signal, to send the reference signal in the determined time unit. Correspondingly, the network device may determine, based on the first time information and the time unit in which the downlink control information is located, a time unit for receiving the reference signal, to receive the reference signal in the determined time unit.

Optionally, the communication system 100 may include one or more network devices, for example, the network device #1 102 and the network device #2 103 shown in the figure. The network device #1 102 and the network device #2 103 may be network devices in a same cell, or may be network devices in different cells. This is not limited in this application. The figure is merely an example, and shows an example in which the network device #1 102 and the network device #2 103 are located in a same cell.

For ease of understanding embodiments of this application, several terms used in embodiments of this application are first briefly described.

1. Reference Signal (RS)

In embodiments of this application, the reference signal includes, for example, but is not limited to, a channel state information reference signal (CSI-RS), a synchronization signal/physical broadcast channel block (SSB), and a sounding reference signal (SRS). A tracking reference signal (TRS) is also a type of CSI-RS.

In embodiments of this application, the SRS is used as an example of the reference signal for description, and sending of the SRS by the terminal device is used as an example of sending of the reference signal by the terminal device. The SRS sent by the terminal device may be understood as a triggered SRS, and the triggered SRS may be understood as an SRS triggered by at least one of a higher layer parameter configured by using radio resource control (RRC) signaling, or a MAC CE or DCI sent by the network device. From a perspective of time-domain behavior, the SRS is configured as a periodic sounding reference signal (P-SRS), a semi-persistent sounding reference signal (SP-SRS), or an aperiodic sounding reference signal (AP-SRS) by using a resource type (resourceType) in a higher layer parameter.

For the periodic SRS, the network device may configure a periodicity and an offset for the SRS by using a higher layer parameter, and the terminal device may periodically send the SRS based on the configured periodicity and offset. The periodic SRS may be understood as that periodic SRS sending is triggered by a higher layer parameter, and time-domain behavior of the periodic SRS may be understood as sending the SRS by using periodic time-domain behavior.

For the semi-persistent SRS, the network device may configure a periodicity and an offset for the SRS by using a higher layer parameter, and send an activation command or a deactivation command to the terminal device by using a MAC CE. When receiving the activation command, the terminal device may periodically send the SRS based on the configured periodicity and offset. If receiving the deactivation command later, the terminal device stops sending the SRS. The semi-persistent SRS may be understood as that SRS sending is triggered by the MAC CE, and time-domain behavior of the semi-persistent SRS may be understood as sending the SRS by using semi-persistent time-domain behavior.

For the aperiodic SRS, the network device triggers, based on DCI, the terminal device to send the SRS. The terminal device receives the DCI in a slot n. determines. based on an offset defined by a higher layer parameter and the slot n. a slot for sending the SRS, and sends the SRS in the determined slot. The aperiodic SRS may be understood as that SRS sending is triggered by DCI, and time-domain behavior of the aperiodic SRS may be understood as sending the SRS by using aperiodic time-domain behavior.

The SRS sent by the terminal device may be an SRS corresponding to a triggered SRS resource set. One SRS resource set may include one or more SRS resources. The network device may configure one or more SRS resource sets for the terminal device by using a higher layer parameter SRS-ResourceSet. Applicability of each SRS resource set may be configured by using usage in the higher layer parameter SRS-ResourceSet. Usages currently supported include four usages: 'codebook', 'nonCodebook', 'beamManagement', and 'antennaSwitching'. 'codebook' corresponds to that the SRS supports codebook-based uplink transmission, 'nonCodebook' corresponds to that the SRS supports non-codebook-based uplink transmission, 'beamManagement' corresponds to that the SRS supports beam management, and 'antennaSwitching' corresponds to that the SRS supports antenna switching.

Currently, for SRS sending triggered by DCI (namely, the aperiodic SRS), the network device defines a slot-level offset by using a higher layer parameter slotOffset, and the terminal device receives DCI used for downlink scheduling, group common DCI, or uplink DCI. At least one bit state in bit states corresponding to an SRS request field in the DCI is used to trigger one or more configured SRS resource sets. When no supplementary uplink information is configured, a field length of the SRS request field in the DCI is two bits. The two bits correspond to four bit states. For example, refer to Table 1-1 below.

TABLE 1-1

| Value of SRS request field | Triggered SRS resource set(s) for DCI format 0_1, 0_2, 1_1, 1_2, and 2_3 (higher layer parameter srs-TPC-PDCCH-Group set to 'typeB') | Triggered SRS resource set(s) for DCI format 2_3 (higher layer parameter srs-TPC-PDCCH-Group set to 'typeA') |
|---|---|---|
| 00 | No SRS resource set triggered | No SRS resource set triggered |
| 01 | SRS resource set(s) configured with higher layer parameter aperiodicSRS-ResourceTrigger set to 1 or an entry in aperiodicSRS-ResourceTriggerList set to 1 | 1st SRS resource set configured with usage set to 'antennaSwitching' in serving cells configured by higher layers |
| 10 | SRS resource set(s) configured with higher layer parameter aperiodicSRS-ResourceTrigger set to | 2nd SRS resource set configured with usage set to |

TABLE 1-1-continued

| Value of SRS request field | Triggered SRS resource set(s) for DCI format 0_1, 0_2, 1_1, 1_2, and 2_3 (higher layer parameter srs-TPC-PDCCH-Group set to 'typeB') | Triggered SRS resource set(s) for DCI format 2_3 (higher layer parameter srs-TPC-PDCCH-Group set to 'typeA') |
|---|---|---|
| | 2 or an entry in aperiodicSRS-ResourceTriggerList set to 2 | 'antennaSwitching' in serving cells configured by higher layers |
| 11 | SRS resource set(s) configured with higher layer parameter aperiodicSRS-ResourceTrigger set to 3 or an entry in aperiodicSRS-ResourceTriggerList set to 3 | $3^{rd}$ SRS resource set configured with usage set to 'antennaSwitching' in serving cells configured by higher layers |

In Table 1-1, when a bit state corresponding to the SRS request field is 00, it indicates that there is no triggered SRS resource set, in other words, there is no SRS sent in aperiodic time-domain manner. For example, for typeB, when a bit state corresponding to the SRS request field is 01, and in a case of SRS resource set(s) configured with higher layer parameter aperiodicSRS-ResourceTrigger set to 1, it indicates that the triggered SRS resource set is SRS resource set(s) configured with higher layer parameter aperiodicSRS-ResourceTrigger set to 1. Alternatively, when a bit state corresponding to the SRS request field is 01 and in a case of SRS resource set(s) configured with an entry in the higher layer parameter aperiodicSRS-ResourceTriggerList set to 1, it indicates that the triggered SRS resource set is SRS resource set(s) configured with an entry in the higher layer parameter aperiodicSRS-ResourceTriggerList set to 1. For example, for typeA, when a bit state corresponding to the SRS request field is 01, and in a case of $1^{st}$ SRS resource set configured with usage set to 'antennaSwitching' in serving cells configured by higher layers, it indicates that the triggered SRS resource set is $1^{st}$ SRS resource set configured with usage set to 'antennaSwitching' in serving cells configured by higher layers.

When supplementary uplink information is configured, the field length of the SRS request field in the DCI is three bits. In the three bits, the first bit indicates non-supplementary uplink/supplementary uplink information. For a definition of the first bit, for example, refer to Table 1-2 below. For definitions of the second bit and the third bit, refer to Table 1-1 above.

TABLE 1-2

| Value of the first bit | Uplink |
|---|---|
| 0 | Non-supplementary uplink information |
| 1 | Supplementary uplink information |

It is assumed that the terminal device receives, in the slot n, DCI used to trigger aperiodic time-domain behavior. When a non-alignment frame is not considered, the terminal device may send the SRS in a slot expressed by formula (1-1).

$$\left\lfloor n \cdot \frac{2^{\mu_{SRS}}}{2^{\mu_{PDCCH}}} \right\rfloor + k \quad \text{formula (1-1)}$$

When an alignment frame is considered, the terminal device may send the SRS in a slot expressed by formula (1-2).

$$\left\lfloor n \cdot \frac{2^{\mu_{SRS}}}{2^{\mu_{PDCCH}}} \right\rfloor + k + \left\lfloor \left( \frac{N_{slot,offset,PDCCH}^{CA}}{2^{\mu_{offset,PDCCH}}} - \frac{N_{slot,offset,SRS}^{CA}}{2^{\mu_{offset,SRS}}} \right) \cdot 2^{\mu_{SRS}} \right\rfloor \quad \text{formula (1-2)}$$

In formula (1-1) and formula (1-2), k represents the slot-level offset configured by the higher layer parameter slotOffset: $2^{\mu_{SRS}}$ represents subcarrier spacing configuration for the SRS based on a subcarrier spacing of SRS transmission; $2^{\mu_{PDCCH}}$ represents subcarrier spacing configuration for a PDCCH carrying a triggering command based on the subcarrier spacing of SRS transmission; and represents rounding down. In formula (1-2), $$N_{slot,offset}^{CA}$$

represents a slot offset between a primary cell (PCell)/primary secondary cell (PScell) A and a secondary cell (SCell) B; and $\mu_{offset}$ represents a maximum value configured for a minimum subcarrier spacing among all subcarrier spacings configured for each cell in each cell pair by using a higher layer parameter SCS-SpecificCarrierList. The network device configures, for an SRS by using a higher layer parameter resourceMapping, a quantity of consecutive orthogonal frequency division multiplexing (OFDM) symbols for sending the SRS and a location of a start symbol occupied by the SRS in the slot where the aperiodic SRS resource set is transmitted.

NR slot formats include a downlink symbol, an uplink symbol, and a flexible symbol. An SRS is sent on an uplink symbol or a flexible symbol. For example, it is assumed that a slot including a downlink symbol is defined as "D", a slot including an uplink symbol and a flexible symbol is defined as "U", and a slot including both a downlink symbol and/or an uplink symbol and a flexible symbol is defined as "S". Herein, it is assumed that the uplink symbol and the flexible symbol included in "S" can meet a sending requirement of sending an SRS by using aperiodic time-domain behavior. Table 1-3 below lists possible triggering cases for different higher layer parameter slotOffset configurations when a slot format is configured as "DDDSU".

TABLE 1-3

| slotOffset | D | D | D | S | U |
|---|---|---|---|---|---|
| 1 | | | PDCCH | SRS | |
| 2 | | PDCCH | | SRS | |
| 2 | | | PDCCH | | SRS |

TABLE 1-3-continued

| slotOffset | D | D | D | S | U |
|---|---|---|---|---|---|
| 3 | PDCCH | | | SRS | |
| 3 | | PDCCH | | | SRS |

In Table 1-3, when slotOffset of the SRS is configured as 1 (in other words, k=1), the DCI used to trigger the SRS is sent on the third "D". In this case, n=2, k=1 and a sending location of the SRS is slot 3, that is, "S". When slotOffset of the SRS is configured as 2 (in other words, k=2), if the DCI used to trigger the SRS is sent on the second "D", n=1, k=2; and a sending location of the resource set is slot 3, that is, "S"; and if the DCI used to trigger the SRS is sent on the third "D", n=2, k=2, and a sending location of the resource set is slot 4, that is, "U".

2. Control Information

The control information is used to trigger a terminal device to send a reference signal RS. The control information is, for example, but is not limited to, downlink control information (DCI), or a MAC CE, or RRC signaling, or other higher layer signaling. The higher layer signaling may be, for example, but is not limited to, one or more of terminal device-specific radio resource control signaling, cell-specific radio resource control signaling, or a higher layer parameter. As used in embodiments of this application, the higher layer configuration information may be RRC signaling or other higher layer signaling, or a MAC CE.

3. Antenna Port and Antenna Switching

When a usage type configured for a terminal device is 'antennaSwitching', the terminal device reports a terminal device capability. For details about the terminal device capability, refer to Table 1-4 below: A network device configures the terminal device based on the received terminal device capability:

TABLE 1-4

| Terminal device capability | Representation | Explanation |
|---|---|---|
| 't1r2' | 1T2R | The terminal device supports one transmit antenna port and two receive antenna ports. |
| 't1r1-t1r2' | 1T = 1R/1T2R | The terminal device supports one transmit antenna port and one receive antenna port, or one transmit antenna port and two receive antenna ports. |
| 't2r4' | 2T4R | The terminal device supports two transmit antenna ports and four receive antenna ports. |
| 't1r4' | 1T4R | The terminal device supports one transmit antenna port and four receive antenna ports. |
| 't1r1-t1r2-t1r4' | 1T = 1R/1T2R/1T4R | The terminal device supports one transmit antenna port and one receive antenna port, or one transmit antenna port and two receive antenna ports, or one transmit antenna port and four receive antenna ports. |
| 't1r4-t2r4' | 1T4R/2T4R | The terminal device supports one transmit antenna port and four receive antenna ports, or two transmit antenna ports and four receive antenna ports. |
| 't1r1-t1r2-t2r2-t2r4' | 1T = 1R/1T2R/2T = 2R/2T4R | The terminal device supports one transmit antenna port and one receive antenna port, or one transmit antenna port and two receive antenna ports, or two transmit antenna ports and two receive antenna ports, or two transmit antenna ports and four receive antenna ports. |
| 't1r1-t1r2-t2r2-t1r4-t2r4' | 1T = 1R/1T2R/2T = 2R/1T4R/2T4R | The terminal device supports one transmit antenna port and one receive antenna port, or one transmit antenna port and two receive antenna ports, or two transmit antenna ports and two receive antenna ports, or one transmit antenna port and four receive antenna ports, or two transmit antenna ports and four receive antenna ports. |
| 't1r1' | 1T = 1R | The terminal device supports one transmit antenna port and one receive antenna port. |
| 't2r2' | 2T = 2R | The terminal device supports two transmit antenna ports and two receive antenna ports. |
| 't1r1-t2r2' | 1T = 1R/2T = 2R | The terminal device supports one transmit antenna port and one |

TABLE 1-4-continued

| Terminal device capability | Representation | Explanation |
|---|---|---|
| | | receive antenna port, or two transmit antenna ports and two receive antenna ports. |
| 't4r4' | 4T = 4R | The terminal device supports four transmit antenna ports and four receive antenna ports. |
| 't1r1-t2r2-t4r4' | 1T = 1R/2T = 2R/4T = 4R | The terminal device supports one transmit antenna port and one receive antenna port, or two transmit antenna ports and two receive antenna ports, or four transmit antenna ports and four receive antenna ports. |

An antenna port is a logical concept, and there is no direct correspondence between an antenna port and a physical antenna. The antenna port is usually associated with a reference signal, and a meaning of the antenna port may be understood as a transceiver interface on a channel through which the reference signal passes. For a low-frequency system, one antenna port may correspond to one or more antenna array elements. These array elements jointly send the reference signal, and a receive end may consider the array elements as a whole without distinguishing between the array elements. For a high-frequency system, an antenna port may correspond to a beam. Similarly, a receive end only needs to consider the beam as an interface, and does not need to distinguish between array elements.

For 1T2R, a maximum of two SRS resource sets with different resource types resourceType can be configured. Each SRS resource set is configured with two SRS resources, which are transmitted using different symbols. Each SRS resource in an SRS resource set includes one independent SRS port, and an antenna port of the terminal device associated with the SRS port of the second resource in the SRS resource set is different from an antenna port of the terminal device associated with the SRS port of the first SRS resource in the SRS resource set.

For 2T4R, a maximum of two SRS resource sets with different resource types resourceType can be configured. Each SRS resource set is configured with two SRS resources, which are transmitted using different symbols. Each SRS resource in an SRS resource set includes two SRS ports, and an antenna port pair of the terminal device associated with the SRS port pair of the second SRS resource in the SRS resource set is different from an antenna port pair of the terminal device associated with the SRS port pair of the first SRS resource in the SRS resource set.

For 1T4R, zero or one SRS resource set whose time-domain behavior is periodic or semi-persistent may be configured. Each SRS resource set is configured with four SRS resources, which are transmitted using different symbols. Each SRS resource in an SRS resource set includes one independent SRS port, and the SRS port of each SRS resource is associated with a different antenna port of the terminal device.

For 1T4R, zero or two SRS resource sets whose time-domain behavior is aperiodic may be configured. A total of four SRS resources are configured in the two SRS resource sets. The four SRS resources are transmitted on different symbols in two different slots, and an SRS port of each SRS resource is associated with a different antenna port of the terminal device. Two SRS resources may be configured for each SRS resource set. Alternatively, one SRS resource may be configured for one SRS resource set, and three SRS resources may be configured for the other SRS resource set. Values of triggering parameters aperiodicSRS-ResourceTrigger or AperiodicSRS-ResourceTriggerList of the two SRS resource sets are the same, and slot offset parameters slotOffset of the two SRS resource sets are different.

When a quantity of transmit antenna ports is equal to a quantity of receive antenna ports, to be specific, 1T=1R, or 2T=2R, or 4T=4R, a maximum of two SRS resource sets are configured. Each SRS resource set includes one SRS resource, and a quantity of SRS ports of each SRS resource is 1, 2, or 4.

For the usage type 'antennaSwitching', the terminal device expects configuration of a same quantity of SRS ports for all SRS resources in an SRS resource set.

For 1T2R, 1T4R, or 2T4R, the terminal device neither expects configuration or triggering of more than one SRS resource set associated with the usage type 'antennaSwitching' in one slot, nor expects configuration or triggering of more than one SRS resource set associated with the usage type 'antennaSwitching' in one symbol.

As described above, in a process in which SRS sending is triggered by DCI, configuration is performed by using RRC signaling on a per SRS resource set basis. A maximum of one SRS resource set associated with the usage type 'codebook', 'nonCodebook', or 'antennaSwitching' can be configured for a terminal device. Therefore, for one terminal device, only one triggering offset can be configured for each usage. Because a PDCCH can be transmitted only on a downlink symbol or a flexible symbol, and an SRS can be transmitted only on an uplink symbol or a flexible symbol, an existing mechanism of configuring a triggering offset by using RRC signaling limits a possible PDCCH location used to trigger the SRS and a possible sending location of the SRS. When the network device sends, in a slot, DCI used to trigger an aperiodic SRS resource set, SRS triggering fails if a corresponding SRS resource sending location in the slot calculated based on the slot offset is a downlink symbol. When the network device needs to trigger an aperiodic SRS in a slot, a slot location at which the network device may send DCI used to trigger the SRS resource set is fixed. If there is no uplink or downlink scheduling requirement in the corresponding slot, the network device does not send the DCI. In this case, the triggering also fails. In addition, when a quantity of terminal devices increases, a quantity of aperiodic SRSs that need to be triggered at a same time increases. If the slot location for sending DCI that can trigger an SRS is fixed, PDCCH congestion is easily caused. In addition, when a slot format indicator (SFI) is dynamically indicated by DCI, the slot offset configured by RRC signaling is no longer applicable.

In addition, in some scenarios, configuration of time-domain behavior of an SRS resource set by using only RRC signaling causes some problems. For example, for the usage 'codebook' used for physical uplink share channel (PUSCH) precoding calculation, generally, channel sounding may be performed by using an aperiodic SRS. For the usage 'antennaSwitching' used for downlink channel measurement, to better support channel estimation and reduce a channel aging effect, channel sounding usually needs to be performed by using a periodic or semi-persistent SRS. As a result, reduction of usage types by reusing two usages is limited.

Moreover, in some scenarios, configuration of a quantity of antenna ports for an SRS resource set by using only RRC signaling causes problems. For example, in a downlink channel state information (CSI) sounding process, because the network device configures a quantity of transmit antenna ports and a quantity of receive antenna ports for the terminal device based on a reported terminal device capability, the configuration of the quantities of antenna ports can be changed only through semi-static reconfiguration, and cannot be dynamically changed based on different requirements, leading to limitations on scheduling.

In view of this, embodiments of this application provide a reference signal sending method and a communication apparatus, to flexibly send a reference signal, improve a sending success rate, and reduce a probability of PDCCH congestion.

The following describes the reference signal sending method provided in embodiments of this application with reference to the accompanying drawings. It should be noted that in the description. UE is used as an example of the terminal device, and a name of information or data exchanged between the UE and the network device is used as an example, and does not constitute a limitation on embodiments of this application.

Figure 2:
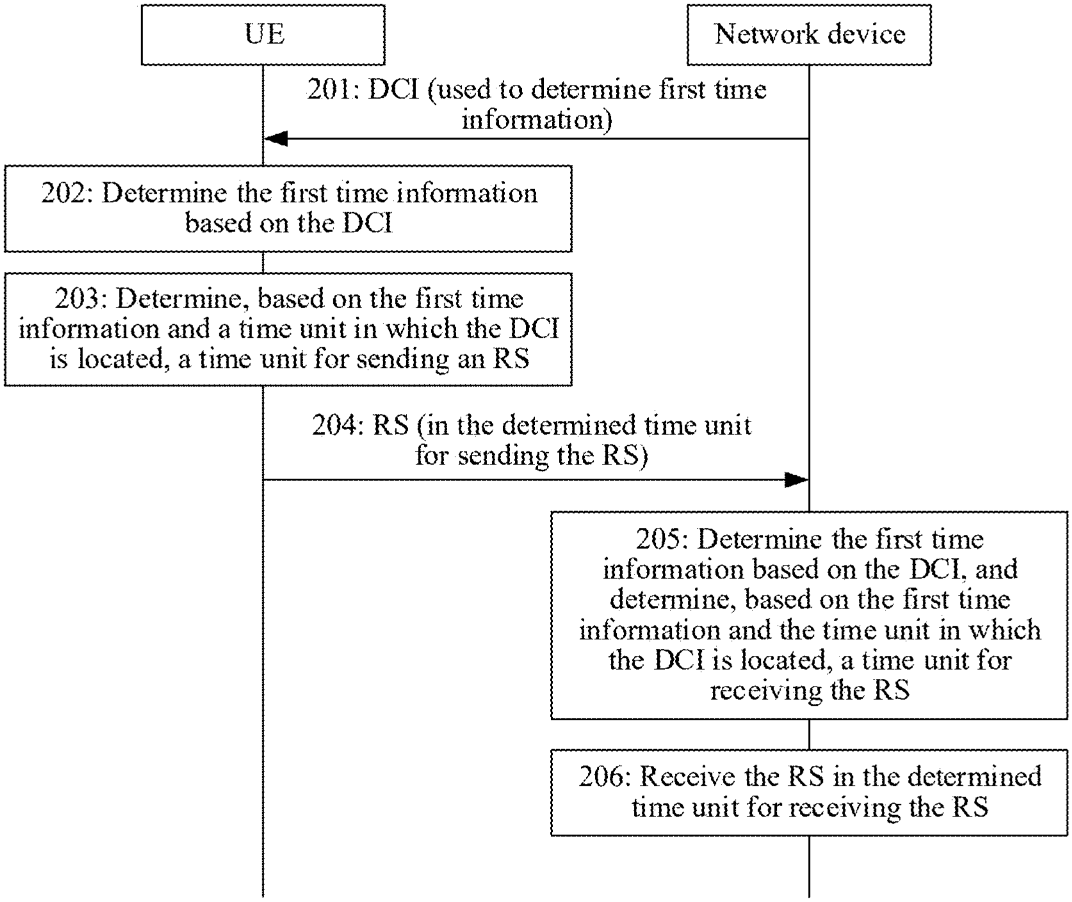
FIG. 2 is a schematic flowchart of a reference signal sending method according to an embodiment of this application.

FIG. 2 is a schematic flowchart of a reference signal sending method according to an embodiment of this application. The method may include but is not limited to the following operations.

Step 201: A network device sends DCI to UE. Correspondingly, the UE receives the DCI from the network device.

The DCI is used to determine first time information. The UE may determine, based on the first time information and a time unit in which the DCI is located, a time unit for sending an RS. The DCI is further used to trigger the UE to send the RS, and may be used to trigger the UE to send a triggered RS.

In an implementation, the DCI includes a first field, the first field is used to determine the first time information, and at least two bit states in bit states corresponding to the first field are associated with a same aperiodic RS resource triggering state. When the RS is an SRS, the aperiodic RS resource triggering state may be SRS resource set(s) configured with a higher layer parameter aperiodicSRS-ResourceTrigger set to 1, 2, or 3; or may be SRS resource set(s) configured with an entry in the higher layer parameter aperiodicSRS-ResourceTriggerList set to 1, 2, or 3: or may be $1^{st}$, $2^{nd}$, or $3^{rd}$ SRS resource set configured with usage set to 'antennaSwitching' in serving cells configured by higher layers. It should be noted that the SRS resource set(s) configured with aperiodicSRS-ResourceTrigger or an entry in aperiodicSRS-ResourceTriggerList set to 1, 2, or 3 are used as an example. With evolution of standards, there may be SRS resources configured with aperiodicSRS-ResourceTrigger or an entry in aperiodicSRS-ResourceTriggerList set to other values.

For example, a field length of the first field is 3 bits, the first field corresponds to eight bit states, and at least two of the eight bit states are associated with a same aperiodicSRS-ResourceTrigger. For example, bit states "010" and "011" are associated with SRS resource set(s) configured with aperiodicSRS-ResourceTrigger set to 1.

The first field may be implemented in one of the following manners.

Manner 1: The field length of the first field is N bits, n bits in the N bits are used to determine the first time information, and bits in the N bits other than the n bits are used to determine the RS to be sent by the UE, in other words, used to determine the triggered RS. 1≤n≤N, and N is a positive integer. The n bits used to determine the first time information may be n consecutive bits, or may be n bits distributed at equal intervals, or may be n bits without any regularity.

For example, N=5, n=3 In the five bits, three consecutive bits are used to determine the first time information, and the remaining two bits are used to determine the RS to be sent by the UE.

Optionally, the n bits used to determine the first time information may be a subfield in the first field, and the bits in the N bits other than the n bits may be another subfield in the first field.

Optionally, when the n bits are used to determine the first time information, the first time information may be determined based on bit states corresponding to the n bits. For example, one bit state corresponds to one piece of first time information. Alternatively, the first time information may be determined based on a bitmap corresponding to the n bits.

It can be learned that in Manner 1, the n bits in the first field indicate the first time information, and the remaining bits indicate the RS, so that flexibility of RS triggering is improved.

Manner 2: The field length of the first field is m bits, the m bits are used to determine the first time information and are used to determine the RS to be sent by the UE, m is an odd number greater than or equal to 3, $(2^m-2)/3$ bit states in $2^m$ bit states corresponding to the first field are associated with the same aperiodic RS resource triggering state.

For example, m=3. The first field corresponds to eight bit states, and at least $(2^m-2)/3=2$ of the eight bit states are associated with a same aperiodicSRS-ResourceTrigger. For example, bit states "010" and "011" are associated with SRS resource set(s) configured with aperiodicSRS-ResourceTrigger set to 1: bit states "100" and "101" are associated with SRS resource set(s) configured with aperiodicSRS-ResourceTrigger set to 2; and bit states "110" and "111" are associated with SRS resource set(s) configured with aperiodicSRS-Resource Trigger set to 3.

Manner 3: The field length of the first field is m bits, the m bits are used to determine the first time information and are used to determine the RS, m is an even number greater than or equal to 4, and $(2^m-1)/3$ bit states in $2^m$ bit states corresponding to the first field are associated with the same aperiodic RS resource triggering state.

For example, m=4. The first field corresponds to 16 bit states, and at least $(2^m-1)/3=5$ of the 16 bit states are associated with a same aperiodicSRS-Resource Trigger. For example, bit states "0001", "0010, "0011", "0100", and "0101" are associated with SRS resource set(s) configured with aperiodicSRS-ResourceTrigger set to 1.

In Manner 2 and Manner 3, field lengths of first fields in DCI in different time windows may be configured by using RRC signaling, a MAC CE, or other higher layer signaling. For example, the RRC signaling is used to configure a field length of a first field in DCI in a first time window as 3 bits, and configure a field length of a first field in DCI in a second time window as 4 bits. It may be understood that the field length of the first field in the DCI may be dynamically configured by using higher layer signaling.

Optionally, in Manner 2 and Manner 3, when the m bits are used to determine the first time information, the first time information may be determined based on bit states corresponding to the m bits. For example, one bit state corresponds to one piece of first time information. Alternatively, the first time information may be determined based on a bitmap corresponding to the m bits.

It can be learned that in Manner 2 and Manner 3, the first field in the DCI indicates both the first time information and the RS, so that the flexibility of RS triggering is improved without increasing DCI overheads.

Manner 4: The field length of the first field is K bits; when k bits in the K bits indicate supplementary uplink information or non-supplementary uplink information, bits in the K bits other than the k bits are used to determine the first time information and/or determine the RS to be sent by the UE; and when no bit that indicates supplementary uplink information or non-supplementary uplink information exists in the K bits, the K bits are used to determine the first time information and/or determine the RS to be sent, where $1 \leq k \leq K$, and K is a positive integer.

For example, K=4,k=1 When one of the four bits indicates supplementary uplink information or non-supplementary uplink information, the other three bits are used to determine the first time information and/or determine the RS to be sent by the UE. The bit that indicates supplementary uplink information or non-supplementary uplink information may be the first bit in the 4 bits for ease of distinguishing. When no bit that indicates supplementary uplink information or non-supplementary uplink information exists in the four bits, the four bits are used to determine the first time information and/or determine the RS to be sent by the UE.

Optionally, in Manner 4, the first time information may be determined based on bit states or a bitmap.

In Manner 4, a length of a field indicating RS sending in DCI in which supplementary uplink information is configured is the same as a field indicating RS sending in DCI in which no supplementary uplink information is configured, so that processing complexity of the terminal device is reduced.

Optionally, the first time information in the foregoing manners is a numerical value, the numerical value is included in a first value set, and the first value set is a set configured by using first higher layer configuration information or is a predefined set. The first higher layer configuration information may be a higher layer parameter slotOffsetlist, which includes a plurality of numerical values. The first time information is one of the plurality of numerical values.

Optionally, in the foregoing manners, the first field indicates second time information, and the second time information and a first time offset are used to determine the first time information. The second time information is included in a second value set. The second value set is a set configured by using second higher layer configuration information or is a predefined set. The first time offset is configured by using third higher layer configuration information or is predefined. The second higher layer configuration information may be configuration information in higher layer signaling such as RRC signaling or a MAC CE. The configuration information is used to configure the second value set. The second value set includes a plurality of numerical values. The second time information is one of the plurality of numerical values. The third higher layer configuration information is a higher layer parameter slotOffset, and is a numerical value.

In another implementation, the DCI includes an RS request field and a time indication field. The time indication field is used to determine the first time information. The time indication field and a first time offset are used to determine the first time information. A value indicated in the time indication field is included in a second value set. The second value set is a set configured by using second higher layer configuration information or is a predefined set. The first time offset is configured by using third higher layer configuration information or is predefined. The second higher layer configuration information may be configuration information in higher layer signaling such as RRC signaling or a MAC CE. The configuration information is used to configure the second value set. The second value set includes a plurality of numerical values. The value indicated in the time indication field is one of the plurality of numerical values. The third higher layer configuration information is a higher layer parameter slotOffset, and is a numerical value. It should be noted that a name of the time indication field is used as an example, and does not constitute a limitation on this application.

The RS request field is used to determine the RS to be sent by the UE. The RS request field may be, for example, an SRS request field. The RS request field may also be described as an RS request section. It should be noted that a name of the RS request field is used as an example, and does not constitute a limitation on this application. With evolution of standards, other names may be used to describe the RS request field, and the other names used to describe the essence of the RS request field should fall within the protection scope of this application.

Step 202: The UE determines the first time information based on the DCI.

The UE may determine the first time information based on the DCI in one of the following three manners.

Manner A: The first field indicates the first time information, and the UE directly obtains the first time information indicated in the first field. The first time information is a numerical value, the numerical value is included in a first value set, and the first value set is a set configured by using first higher layer configuration information or is a predefined set. The first higher layer configuration information may be a higher layer parameter slotOffsetlist, which includes a plurality of numerical values. The first time information is one of the plurality of numerical values. For example, slotOffsetlist includes five values $k_1$ to $k_5$, the first field indicates, $k_1$, and $k_1$ is the first time information.

Manner B: The first field indicates second time information, and the UE determines the first time information based on the second time information and a first time offset. The second time information is included in a second value set. The second value set is a set configured by using second higher layer configuration information or is a predefined set. The first time offset is configured by using third higher layer configuration information or is predefined. The second higher layer configuration information may be configuration information in higher layer signaling such as RRC signaling or a MAC CE. The configuration information is used to configure the second value set. The second value set includes a plurality of numerical values. The second time information is one of the plurality of numerical values. The third higher layer configuration information is a higher layer parameter slotOffset, and is a numerical value. For example, slotOffset is $k_0$, the second value set includes five values $l_1$ to $l_5$, the first field indicates $l_1$, $l_1$ is the second time information, and a sum of $l_1$ and $k_0$ is the first time information.

Manner C: The DCI includes an RS request field and a time indication field, and the time indication field is used to determine the first time information. The UE determines the first time information based on the time indication field and a first time offset. A value indicated in the time indication field is included in a second value set. The second value set is a set configured by using second higher layer configuration information or is a predefined set. The first time offset is configured by using third higher layer configuration information or is predefined. The second higher layer configuration information may be configuration information in higher layer signaling such as RRC signaling or a MAC CE. The configuration information is used to configure the second value set. The second value set includes a plurality of numerical values. The value indicated in the time indication field is one of the plurality of numerical values. The third higher layer configuration information is a higher layer parameter slotOffset, and is a numerical value. For example, slotOffset is $k_0$, the second value set includes five values $l_1$ to $l_5$, the time indication field indicates $l_1$, and a sum of $l_1$ and $k_0$ is the first time information.

In the foregoing Manner B and Manner C, the third higher layer configuration information may be consistent with a time offset configured by existing slotOffset.

It can be learned that values of a plurality of candidate time offsets are configured by using higher layer configuration information, so that flexibility of indicating the time for sending the RS can be improved, an RS scheduling capacity is increased, and a probability of PDCCH congestion is reduced.

In the foregoing Manner B and Manner C, the second value set may be one of the following several cases.

Case 1: A value of at least one element in the second value set is greater than −4 and less than 5, to be specific, elements in the second value set include one or more numerical values in {−3, −2, −1, 0, 1, 2, 3, 4}. For example, the second value set is {−2, −1, 0, 1, 2}. Optionally, if there are two candidate elements, the second value set is {0, 1}. If there are five candidate elements, the second value set is {−2, −1, 0, 1, 2}.

Case 2: A value of at least one element in the second value set is greater than 0 and less than 7, to be specific, elements in the second value set include one or more numerical values in {0, 1, 2, 3, 4, 5, 6, 7}. For example, the second value set is {0, 1}. Optionally, if there are two candidate elements, the second value set is {0, 1}. If there are five candidate elements, the second value set is {−2, −1, 0, 1, 2}.

Case 3: The second value set is related to slot format information. The slot format information may be a commonly used slot configuration, and may include but is not limited to configuration between slots "D" and/or "S" and slots "U". The configuration may be 8:2, 7:3, 4:1, or the like. Optionally, if the slot configuration is 8:2, and the second value set is {−2, −1, 0, 1, 2}, when the RS sending location determined based on the first time offset and the slot in which the DCI is located is the first, second, sixth, seventh, eighth, ninth, and tenth slots in every 10 slots, the RS sending location may be adjusted to an available slot location based on a second value indicated in the time indication field. A negative offset (namely, a negative second value) and a positive offset (namely, a positive second value) are supported, so that a requirement of quick triggering can be met. Optionally, if the slot configuration is 8:2, and the second value set is {0, 1, 2, 3, 4}, when the RS sending location determined based on the first time offset and the slot in which the DCI is located is the fourth, fifth, sixth, seventh, eighth, ninth, and tenth slots in every 10 slots, the RS sending location may be adjusted to an available slot location based on a second value indicated in the time indication field. Optionally, if the slot configuration is 7:3, and the second value set is {0, 1, 2, 3, 4}, when the RS sending location determined based on the first time offset and the slot in which the DCI is located is the third, fourth, fifth, sixth, seventh, eighth, ninth, and tenth slots in every 10 slots, the RS sending location may be adjusted to an available slot location based on a second value indicated in the time indication field. Optionally, if the slot configuration is 4:1, and the second value set is {0, 1, 2, 3, 4}, when the RS sending location determined based on the first time offset and the slot in which the DCI is located is all slots in every five slots, the RS sending location may be adjusted to an available slot location based on a second value indicated in the time indication field. Optionally, if the slot configuration is 4:1, and the second value set is {0, 1, 3, 5, 7}, when the RS sending location determined based on the first time offset and the slot in which the DCI is located is slots distributed at intervals, the RS sending location may be adjusted to an available slot location based on a second value indicated in the time indication field. In this case, a requirement of different triggering speeds can be met.

Step 203: The UE determines, based on the first time information and the time unit in which the DCI is located, the time unit for sending the RS.

It is assumed that there is one time unit for sending the RS.

For Manner A in operation 202, the UE determines, based on the first time information and the time unit in which the DCI is located, the time unit for sending the RS. For example, the first value set configured by using the first higher layer configuration information is $k_1$ and $k_2$, and a time unit in which the DCI is received is a slot n. When the first field indicates if a non-alignment frame is not considered, the UE may determine that the time unit for sending the RS is a slot expressed by formula (2-1); or if a non-alignment frame is considered, the UE may determine that the time unit for sending the RS is a slot expressed by formula (2-2). When the first field indicates k if a non-alignment frame is not considered, the UE may determine that the time unit for sending the RS is a slot expressed by formula (2-3); or if a non-alignment frame is considered, the UE may determine that the time unit for sending the RS is a slot expressed by formula (2-4).

$$\left\lfloor n \cdot \frac{2^{\mu_{SRS}}}{2^{\mu_{PDCCH}}} \right\rfloor + k_1 \quad \text{formula (2-1)}$$

$$\left\lfloor n \cdot \frac{2^{\mu_{SRS}}}{2^{\mu_{PDCCH}}} \right\rfloor + k_1 + \left\lfloor \left( \frac{N_{slot,offset,PDCCH}^{CA}}{2^{\mu_{offset,PDCCH}}} - \frac{N_{slot,offset,SRS}^{CA}}{2^{\mu_{offset,SRS}}} \right) \cdot 2^{\mu_{SRS}} \right\rfloor \quad \text{formula (2-2)}$$

$$\left\lfloor n \cdot \frac{2^{\mu_{SRS}}}{2^{\mu_{PDCCH}}} \right\rfloor + k_2 \quad \text{formula (2-3)}$$

$$\left\lfloor n \cdot \frac{2^{\mu_{SRS}}}{2^{\mu_{PDCCH}}} \right\rfloor + k_2 + \quad \text{formula (2-4)}$$

-continued $$\left\lfloor \left( \frac{N^{CA}_{slot,offset,PDCCH}}{2^{\mu_{offset,PDCCH}}} - \frac{N^{CA}_{slot,offset,SRS}}{2^{\mu_{offset,SRS}}} \right) \cdot 2^{\mu_{SRS}} \right\rfloor$$

Further, in a time window, the first value set configured by using the first higher layer configuration information is $k_1$ and $k_2$, and the UE selects $k_1$ or $k_2$ based on the first field, and determines the time unit for sending the RS. In a next time window, the first value set configured by using the first higher layer configuration information is $k_3$ and $k_4$ and the UE selects $k_3$ or $k_4$ based on the first field, and determines the time unit for sending the RS. Therefore, the network device can flexibly configure the first value set.

For Manner B or Manner C in operation 202, when determining the first time information, the UE determines, based on the first time information and the time unit in which the DCI is located, the time unit for sending the RS. For example, the first time offset is $k_0$, the second value set configured by using the second higher layer configuration information is {−2, −1, 0, 1, 2}, and the UE determines l=2 based on the first field or the time indication field. In this case, if a non-alignment frame is not considered, the UE may determine that the time unit for sending the RS is a slot expressed by formula (2-5).

$$\left\lfloor n \cdot \frac{2^{\mu_{SRS}}}{2^{\mu_{PDCCH}}} \right\rfloor + k_0 + 2 \qquad \text{formula (2-5)}$$

Step 204: The UE sends the RS in the determined time unit for sending the RS.

A quantity of time units for sending the RS may be one or more. The time unit may be a slot, or may be a symbol, or may be a combination of a slot and a symbol. In an embodiment of this application, an example in which the time unit is a slot is used for description.

The UE may determine, in one of the following manners, the quantity of time units for sending the RS.

Manner a: Determine the quantity of time units for sending the RS based on a second field in the DCI. A field length of the second field is m bits. In $2^m$ bit states corresponding to the m bits, a quantity of time units that are used for sending the RS and that are associated with each of M bit states is one, and a quantity of time units that are used for sending the RS and that are associated with each of the $2^m$-M bit states is greater than one. For example, m=3. In the eight bit states, a quantity of time units that are used for sending the RS and that are associated with each of the first three bit states is one, and a quantity of time units that are used for sending the RS and that are associated with each of the last five bit states is greater than one.

m=1, and M=1: or m>1, and M>1: or m>1, and ($2^m$−M)>1: or m>1, M>1, and ($2^m$−M)>1.

When the quantity of associated time units for sending the RS is greater than one, time units for sending the RS are determined based on slotOffsetlist configured by using higher layer configuration information or predefined slotOffsetlist, and a bit state corresponding to the second field in the DCI. For example, if slotOffsetlist includes two value sets {$k_1$ to $k_5$} and {$k_6$ to $k_{10}$}, the quantity of time units that are used for sending the RS and that are associated with the bit state corresponding to the second field in the DCI is greater than one, and the bit state corresponding to the second field indicates the value set {$k_1$ to $k_5$}, five time units for sending the RS are determined based on {$k_1$ to $k_5$}.

Manner b: Determine the quantity of time units for sending the RS based on fourth higher layer configuration information and/or fifth higher layer configuration information. The fourth higher layer configuration information indicates a quantity P of time units for sending the RS, and P is a positive integer. The fourth higher layer configuration information may be RRC signaling or a MAC CE specially used for configuring the quantity. For example, when the fourth higher layer configuration information is configured in a first state, the quantity of time units for sending the RS is more than one. For example, when the fourth higher layer configuration information is configured in a second state, the quantity of time units for sending the RS is one. The fifth higher layer configuration information indicates to enable or disable a plurality of time units. For example, if the fifth higher layer configuration information indicates to enable a plurality of time units, the UE sends the RS by using the plurality of time units. For another example, if the fifth higher layer configuration information indicates to disable a plurality of time units, the UE sends the RS by using one time unit. The fifth higher layer configuration information may be RRC signaling or a MAC CE. The fourth higher layer configuration information and the fifth higher layer configuration information may be carried in same RRC signaling or a same MAC CE, and have different functions.

When the fourth higher layer configuration information indicates that P>1, the bit state corresponding to the DCI indicates a time offset used when the RS is sent by using a plurality of time units, so that the UE determines, based on the time offset, the time unit for sending the RS.

Manner c: Determine the quantity of time units for sending the RS based on a third field in the DCI. A field length of the third field may be one or more bits, and a quantity of time units that are used for sending the RS and that are associated with a bit state corresponding to the third field is one or more. For example, the field length of the third field is one bit. When the bit is "0", the quantity of associated time units for sending the RS is one. When the bit is "1", the quantity of associated time units for sending the RS is more than one.

When the quantity of associated time units for sending the RS is more than one, time units for sending the RS are determined based on slotOffsetlist configured by using higher layer configuration information or predefined slotOffsetlist, and the bit state corresponding to the third field in the DCI. For example, if slotOffsetlist includes two value sets {$k_1$ to $k_5$} and {$k_6$ to $k_{10}$}, the quantity of time units that are used for sending the RS and that are associated with the bit state corresponding to the third field in the DCI is more than one, and the bit state corresponding to the third field indicates the value set {$k_1$ to $k_5$}, five time units for sending the RS are determined based on {$k_1$ to $k_5$}.

If the determined quantity of time units for sending the RS is one, the UE may send the RS in the time unit determined in operation 203. If the determined quantity of time units for sending the RS is more than one, the UE repeatedly performs operation 203, and separately sends the RS in the determined time units.

Optionally, the UE further determines a resource quantity of the RS. The resource quantity of the RS may be understood as a quantity of triggered RS resources included in a triggered RS resource set. One RS resource set may include one or more RS resources.

The UE may determine the resource quantity of the RS in one of the following manners.

Manner (1): Determine the resource quantity of the RS based on a fourth field in the DCI. A field length of the fourth field is m bits. In $2^m$ bit states corresponding to the m bits, a resource quantity of the RS associated with each of L bit states is a first quantity, and a resource quantity of the RS associated with each of the $2^m$-L bit states is a second quantity: For example, m=3. In the eight bit states, the resource quantity of the RS associated with each of the first three bit states is four RS resources, indicating that four RS resources in an RS resource set are triggered; and the resource quantity of the RS associated with each of the last five bit states is two RS resources, indicating that two RS resources in an RS resource set are triggered.

m=1 and L=1: or m>1, and L>1: or m>1, and ($2^m$-L)>1: or m>1, L>1, and ($2^m$-L)>1. Whether the resource quantity of the RS is the first quantity or the second quantity may be configured by using higher layer configuration information or may be predefined. Manner (2): Determine the resource quantity of the RS based on sixth higher layer configuration information. The sixth higher layer configuration information indicates whether the resource quantity of the RS is a first quantity or a second quantity. The sixth higher layer configuration information may be RRC signaling or a MAC CE specially used for configuring the quantity. For example, when the sixth higher layer configuration information is configured in a first state, the resource quantity of the RS is the first quantity. When the sixth higher layer configuration information is configured in a second state, the resource quantity of the RS is the second quantity.

Manner (3): The field length of the first field is an odd number greater than or equal to 3; when a bit state corresponding to the first field is not a specific value, the resource quantity of the RS is a first quantity; and when the bit state corresponding to the first field is the specific value or an RS resource information switching indication is received, the resource quantity of the RS is a second quantity: Whether the resource quantity of the RS is the first quantity or the second quantity is configured by using higher layer configuration information or is predefined.

Manner (4): Determine the resource quantity of the RS based on a fifth field in the DCI. A field length of the fifth field may be one or more bits, and a resource quantity of the RS associated with a bit state corresponding to the fifth field is a first quantity or a second quantity. For example, the field length of the fifth field is one bit. When the bit is "0", the associated resource quantity of the RS is the first quantity. When the bit is "1", the associated resource quantity of the RS is the second quantity: Whether the resource quantity of the RS is the first quantity or the second quantity may be configured by using higher layer configuration information or may be predefined.

It can be learned that the resource quantity of the RS is switched based on an indication of the DCI or higher layer configuration information, so that configuration flexibility of the RS is improved, and accuracy of downlink channel information measurement is ensured or power consumption of the terminal device is reduced.

Optionally, the UE may further determine a port quantity of the RS in one of the following manners.

Manner (I): Determine the port quantity of the RS based on a sixth field in the DCI. A field length of the sixth field is m bits. In $2^m$ bit states corresponding to the m bits, a port quantity of the RS associated with each of Q bit states is a third quantity, and a port quantity of the RS associated with each of the $2^m$-Q bit states is a fourth quantity. For example, m=3 In the eight bit states, the port quantity of the RS associated with each of the first three bit states is four RS ports, indicating that the RS may be sent through four RS ports; and the port quantity of the RS associated with each of the last five bit states is two RS ports, indicating that the RS may be sent through two RS ports.

m=1, and Q=1: or m>1, and Q>1: or m>1, and ($2^m$-Q)>1; or m>1, Q>1, and ($2^m$-Q)>1. Whether the port quantity of the RS is the third quantity or the fourth quantity may be configured by using higher layer configuration information or may be predefined.

Manner (II): Determine the port quantity of the RS based on seventh higher layer configuration information. The seventh higher layer configuration information indicates whether the port quantity of the RS is a third quantity or a fourth quantity. The seventh higher layer configuration information may be RRC signaling or a MAC CE specially used for configuring the quantity. For example, when the seventh higher layer configuration information is configured in a first state, the port quantity of the RS is the third quantity. When the seventh higher layer configuration information is configured in a second state, the port quantity of the RS is the fourth quantity:

Manner (III): The field length of the first field is an odd number greater than or equal to 3; when a bit state corresponding to the first field is not a specific value, the port quantity of the RS is a third quantity; and when the bit state corresponding to the first field is the specific value or the terminal device receives an RS port information switching indication, the port quantity of the RS is a fourth quantity: Whether the port quantity of the RS is the third quantity or the fourth quantity is configured by using higher layer configuration information or is predefined.

Manner (IV): Determine the port quantity of the RS based on a seventh field in the DCI. A field length of the seventh field may be one or more bits, and a port quantity of the RS associated with a bit state corresponding to the seventh field is a third quantity or a fourth quantity. For example, the field length of the seventh field is one bit. When the bit is "0", the associated port quantity of the RS is the third quantity: When the bit is "1", the associated port quantity of the RS is the fourth quantity: Whether the port quantity of the RS is the third quantity or the fourth quantity may be configured by using higher layer configuration information or may be predefined.

It can be learned that the port quantity of the RS is switched based on an indication of the DCI or higher layer configuration information, so that configuration flexibility of the RS for performing an antenna switching function is improved, and accuracy of downlink channel information measurement is ensured or power consumption of the terminal device is reduced.

Step 205: The network device determines the first time information based on the DCI, and determines, based on the first time information and the time unit in which the DCI is located, a time unit for receiving the RS.

The determining, by the network device based on the DCI, the first time information, and determining, based on the first time information and the time unit in which the DCI is located, the time unit for receiving the RS is similar to the determining, by the UE based on the DCI, the first time information, and determining, based on the first time information and the time unit in which the DCI is located, the time unit for sending the RS. Details are not described herein again.

It should be noted that a sequence of performing operation 203 and operation 204 is not limited in this application. After sending the DCI, the network device may determine the time unit for receiving the RS.

Step 206: The network device receives the RS in the determined time unit for receiving the RS.

The network device receives the RS in the determined time unit for receiving the RS. Further, beam management and the like are performed based on the received RS.

In FIG. 2, the time for sending the RS is dynamically indicated by using the DCI, so that the time for sending the RS is more flexible, an SRS scheduling capacity is increased, and the probability of PDCCH congestion is reduced.

Based on FIG. 2, embodiments are described below by using an example in which the RS is an SRS.

Figure 3:
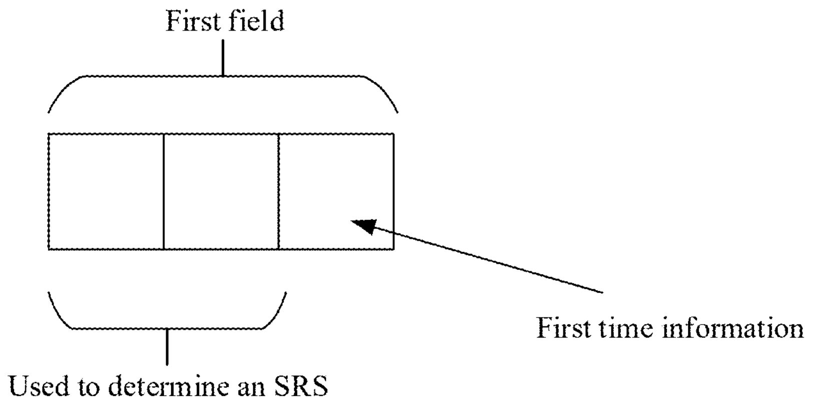
FIG. 3 is an example diagram of a first field according to Embodiment 1 of this application.

Embodiment 1: The field length of the first field is three bits, and the last bit of the three bits indicates the first time information. Refer to a first field shown in FIG. 3. One rectangular block represents one bit. In FIG. 3, the first two bits are used to determine the SRS.

Before operation 201, the method further includes operation 200: The network device sends higher layer configuration information to the UE, where SRS-ResourceSet in the higher layer configuration information is used to configure an SRS resource set. For each SRS resource set, slotOffsetList in the higher layer configuration information is used to configure a first value set, which includes $k_1$ and $k_2$ The last bit in the three bits indicates $k_1$ or $k_2$. It is assumed that a value '0' of the last bit indicates $k_1$; and a value '1' of the last bit indicates $k_2$ Based on this assumption, for the bit states corresponding to the first field, refer to Table 2-1 below. Table 2-1 is used as an example, and does not constitute a limitation on this application.

TABLE 2-1

| First field | Triggered SRS resource set(s) for DCI format 0_1, 0_2, 1_1, 1_2, and 2_3 (higher layer parametersrs-TPC-PDCCH-Group set to 'typeB') | Triggered SRS resource set(s) for DCI format 2_3 (higher layer parameter srs-TPC-PDCCH-Group set to 'typeA') | First time information |
|---|---|---|---|
| 000 | No SRS resource set triggered (or there is no triggered SRS resource set) | | |
| 001 | Indicate SRS resource quantity switching or SRS port quantity switching | | |
| 010 | SRS resource set(s) configured with higher layer parameter aperiodicSRS-ResourceTrigger set to 1 or an entry in aperiodicSRS-ResourceTriggerList set to 1 | $1^{st}$ SRS resource set configured with usage set to 'antennaSwitching' in serving cells configured by higher layers | $k_1$ |
| 011 | SRS resource set(s) configured with higher layer parameter aperiodicSRS-ResourceTrigger set to 1 or an entry in aperiodicSRS-ResourceTriggerList set to 1 | $1^{st}$ SRS resource set configured with usage set to 'antennaSwitching' in serving cells configured by higher layers | $k_2$ |
| 100 | SRS resource set(s) configured with higher layer parameter aperiodicSRS-ResourceTrigger set to 2 or an entry in aperiodicSRS-ResourceTriggerList set to 2 | $2^{nd}$ SRS resource set configured with usage set to 'antennaSwitching' in serving cells configured by higher layers | $k_1$ |
| 101 | SRS resource set(s) configured with higher layer parameter aperiodicSRS-ResourceTrigger set to 2 or an entry in aperiodicSRS-ResourceTriggerList set to 2 | $2^{nd}$ SRS resource set configured with usage set to 'antennaSwitching' in serving cells configured by higher layers | $k_2$ |
| 110 | SRS resource set(s) configured with higher layer parameter aperiodicSRS-ResourceTrigger set to 3 or an entry in aperiodicSRS-ResourceTriggerList set to 3 | $3^{rd}$ SRS resource set configured with usage set to 'antennaSwitching' in serving cells configured by higher layers | $k_1$ |
| 111 | SRS resource set(s) configured with higher layer parameter aperiodicSRS-ResourceTrigger set to 3 or an entry in aperiodicSRS-ResourceTriggerList set to 3 | $3^{rd}$ SRS resource set configured with usage set to 'antennaSwitching' in serving cells configured by higher layers | $k_2$ |

The UE determines the triggered SRS resource set based on the first two bits of the first field and the higher layer parameter. Refer to the determining of the triggered SRS resource set in Table 1-1. Details are not described herein again.

When a value of the first field received by the UE is 010, 100, or 110, and a non-alignment frame is not considered, the UE may send the SRS in the slot expressed by formula (2-1).

When the value of the first field received by the UE is 011, 101, or 111, and the non-alignment frame is not considered, the UE may send the SRS in the slot expressed by formula (2-3).

When the value of the first field received by the UE is 000, it indicates that no SRS resource set is triggered or there is no triggered SRS resource set, and the UE does not send the SRS.

In an implementation, when the value of the first field received by the UE is 001, which is a specific value, the resource quantity of the SRS is the second quantity. When the value of the first field received by the UE is a value other than 000 and 001, the resource quantity of the SRS is the first quantity. Higher layer configuration information indicates whether the resource quantity of the SRS is the first quantity or the second quantity. The higher layer configuration information is carried in operation 200.

It may be understood that when the value of the first field is 001 or an SRS resource quantity switching indication is received, the UE switches from sending the SRS by using the first quantity of SRS resources to sending the SRS by using the second quantity of SRS resources. For example, the UE switches from triggering all four SRS resources in an SRS resource set to triggering two SRS resources in an SRS resource set.

In another implementation, when the value of the first field received by the UE is 001, which is a specific value, the port quantity of the SRS is the third quantity. When the value of the first field received by the UE is a value other than 000 and 001, the port quantity of the SRS is the fourth quantity: Higher layer configuration information indicates whether the port quantity of the SRS is the third quantity or the fourth quantity: The higher layer configuration information is carried in operation 200. For example, the third quantity is p1, and the fourth quantity is p2.

It may be understood that when the value of the first field is 001 or an SRS port information switching indication is received, the UE switches from sending the triggered SRS through the third quantity of antenna ports to sending the triggered SRS through the fourth quantity of antenna ports, for example, switches from sending the triggered SRS through p1 antenna ports to sending the triggered SRS through p2 antenna ports. It may be understood that p1 is a default value.

Optionally, when sending the SRS through the fourth quantity of antenna ports, the UE may determine, based on a default time offset, the time unit for sending the SRS. The default time offset may be specified in a protocol or may be predefined.

RS is switched based on the specific value indicated in the DCI, so that configuration flexibility of RS resources is improved, and accuracy of downlink channel information measurement is ensured or power consumption of the terminal device is reduced. The transmit port quantity of the RS is switched based on the specific value indicated in the DCI, so that configuration flexibility of the RS for performing an antenna switching function is improved, and accuracy of downlink channel information measurement is ensured or power consumption of the terminal device is reduced.

Figure 4:
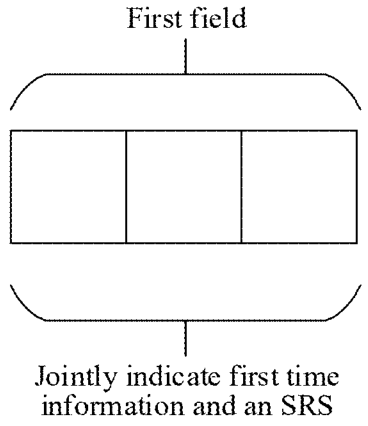
FIG. 4 is an example diagram of a first field according to Embodiment 2 of this application.

Embodiment 2: The field length of the first field is three bits, and the three bits jointly indicate the first time information and the SRS. Refer to a first field shown in FIG. 4. In FIG. 4, the three bits jointly indicate the first time information and the SRS, and whether each bit indicates the first time information or the SRS is not specified.

Before operation 201, the method further includes operation 200: The network device sends higher layer configuration information to the UE, where SRS-ResourceSet in the higher layer configuration information is used to configure an SRS resource set. For each SRS resource set, slotOffsetList in the higher layer configuration information is used to configure a first value set, which includes $k_1$ and $k_2$. For the bit states corresponding to the first field, refer to Table 2-2 below. Table 2-2 is used as an example, and does not constitute a limitation on this application.

TABLE 2-2

| First field | Triggered SRS resource set(s) for DCI format 0_1, 0_2, 1_1, 1_2, and 2_3 (higher layer parameter srs-TPC-PDCCH-Group set to ‘typeB’) | Triggered SRS resource set(s) for DCI format 2_3 (higher layer parameter srs-TPC-PDCCH-Group set to ‘typeA’) | First time information |
|---|---|---|---|
| 000 | No SRS resource set triggered (or there is no triggered SRS resource set) | | |
| 111 | Indicate SRS resource quantity switching or SRS port quantity switching | | |
| 001 | SRS resource set(s) configured with higher layer parameter aperiodicSRS-ResourceTrigger set to 1 or an entry in aperiodicSRS-ResourceTriggerList set to 1 | $1^{st}$ SRS resource set configured with usage set to ‘antennaSwitching’ in serving cells configured by higher layers | $k_1$ |
| 110 | SRS resource set(s) configured with higher layer parameter aperiodicSRS-ResourceTrigger set to 1 or an entry in aperiodicSRS-ResourceTriggerList set to 1 | $1^{st}$ SRS resource set configured with usage set to ‘antennaSwitching’ in serving cells configured by higher layers | $k_2$ |
| 010 | SRS resource set(s) configured with higher layer parameter aperiodicSRS-ResourceTrigger set to 2 or an entry in aperiodicSRS-ResourceTriggerList set to 2 | $2^{nd}$ SRS resource set configured with usage set to ‘antennaSwitching’ in serving cells configured by higher layers | $k_1$ |
| 101 | SRS resource set(s) configured with higher layer parameter aperiodicSRS-ResourceTrigger set to 2 or an entry in aperiodicSRS-ResourceTriggerList set to 2 | $2^{nd}$ SRS resource set(s) configured with usage set to ‘antennaSwitching’ in serving cells configured by higher layers | $k_2$ |
| 011 | SRS resource set(s) configured with higher layer parameter aperiodicSRS-ResourceTrigger set to 3 or an entry in aperiodicSRS-ResourceTriggerList set to 3 | $3^{rd}$ SRS resource set configured with usage set to ‘antennaSwitching’ in serving cells configured by higher layers | $k_1$ |
| 100 | SRS resource set(s) configured with higher layer parameter aperiodicSRS-ResourceTrigger set to 3 or an entry in aperiodicSRS-ResourceTriggerList set to 3 | $3^{rd}$ SRS resource set configured with usage set to ‘antennaSwitching’ in serving cells configured by higher layers | $k_2$ |

In Embodiment 1, the time for sending the RS is dynamically indicated by using the DCI, so that the time for sending the RS is more flexible, an SRS scheduling capacity is increased, and the probability of PDCCH congestion is reduced. It can be learned that the resource quantity of the The UE determines the triggered SRS resource set based on the values of the three bits in the first field and the higher layer parameter. Refer to the determining of the triggered SRS resource set in Table 1-1. Details are not described herein again.

When a value of the first field received by the UE is 001, 010, or 011, and a non-alignment frame is not considered, the UE may send the SRS in the slot expressed by formula (2-1).

When the value of the first field received by the UE is 110, 101, or 100, and the non-alignment frame is not considered, the UE may send the SRS in the slot expressed by formula (2-3).

In an implementation, when the value of the first field received by the UE is 111, which is a specific value, the resource quantity of the SRS is the second quantity. When a value of the first field received by the UE is a value other than 000 and 111, the resource quantity of the SRS is the first quantity.

In another implementation, when the value of the first field received by the UE is 111, which is a specific value, the port quantity of the SRS is the third quantity. When the value of the first field received by the UE is a value other than 000 and 111, the port quantity of the SRS is the fourth quantity.

In Embodiment 2, the three bits of the first field are used to jointly indicate the first time information and the SRS, so that the time for sending the RS is more flexible, an SRS scheduling capacity is increased, and the probability of PDCCH congestion is reduced.

Figure 5:
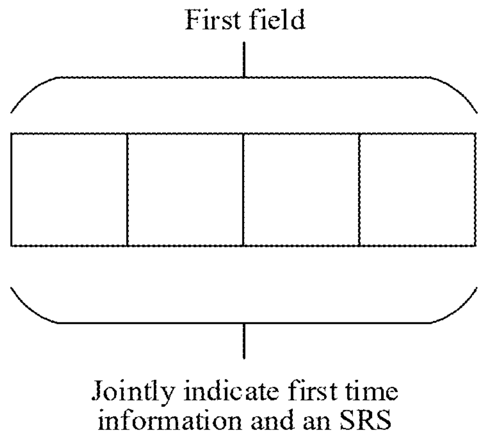
FIG. 5 is an example diagram of a first field according to Embodiment 3 of this application.

Embodiment 3: The field length of the first field is four bits, and the four bits jointly indicate the first time information and the SRS. Refer to a first field shown in FIG. 5. In FIG. 5, the four bits jointly indicate the first time information and the SRS, and whether each bit indicates the first time information or the SRS is not specified.

Before operation 201, the method further includes operation 200: The network device sends higher layer configuration information to the UE, where SRS-ResourceSet in the higher layer configuration information is used to configure an SRS resource set. For each SRS resource set, slotOffsetList in the higher layer configuration information is used to configure a first value set, which includes $k_1$ to $k_5$. For the bit states corresponding to the first field, refer to Table 2-3 below. Table 2-3 is used as an example, and does not constitute a limitation on this application.

TABLE 2-3

| First field | Value of higher layer parameter aperiodicSRS-ResourceTrigger or an entry in aperiodicSRS-ResourceTriggerList configured for triggered SRS resource set(s) for DCI format 0_1, 0_2, 1_1, 1_2, and 2_3 (higher layer parameter srs-TPC-PDCCH-Group set to 'typeB') | Set number of serving cells in which triggered SRS resource set(s) usage configured by higher layers set to 'antennaSwitching' for DCI format 2_3 (higher layer parameter srs-TPC-PDCCH-Group set to 'typeA') | First time information |
|---|---|---|---|
| 0000 | No SRS resource set triggered (or there is no triggered SRS resource set) | | |
| 0001 | 1 | 1 | $k_1$ |
| 0010 | 1 | 1 | $k_2$ |
| 0011 | 1 | 1 | $k_3$ |
| 0100 | 1 | 1 | $k_4$ |
| 0101 | 1 | 1 | $k_5$ |
| 0110 | 2 | 2 | $k_1$ |
| 0111 | 2 | 2 | $k_2$ |
| 1000 | 2 | 2 | $k_3$ |
| 1001 | 2 | 2 | $k_4$ |
| 1010 | 2 | 2 | $k_5$ |
| 1011 | 3 | 3 | $k_1$ |
| 1100 | 3 | 3 | $k_2$ |
| 1101 | 3 | 3 | $k_3$ |
| 1110 | 3 | 3 | $k_4$ |
| 1111 | 3 | 3 | $k_5$ |

In Embodiment 3, the four bits of the first field are used to jointly indicate the first time information and the SRS, so that more first time information can be indicated, and the time for sending the RS is more flexible, an SRS scheduling capacity is increased, and the probability of PDCCH congestion is reduced.

Figure 6:
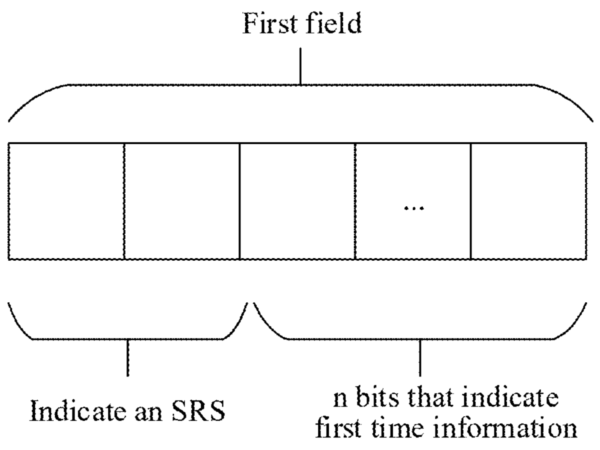
FIG. 6 is an example diagram of a first field according to Embodiment 4 of this application.

Embodiment 4: The field length of the first field is N, n bits in the first field indicate the first time information, and bits in the N bits other than the n bits indicate the SRS. It is assumed that the last n bits indicate the first time information. Refer to a first field shown in FIG. 6. In FIG. 6, the last n bits indicate the first time information, and the first two bits indicate the SRS.

For example, it is assumed that N=5,n=3 and the three bits indicate the first time information in a bitmap form. The three bits are respectively corresponding to three elements in the first value set. If a value of one bit in the three bits is 1, and values of the other bits are 0), the element corresponding to the bit having the value of 1 is the first time information. Alternatively, if a value of one bit in the three bits is 0), and values of the other bits are 1, the element corresponding to the bit having the value of 0) is the first time information.

In Embodiment 4, the DCI is used to explicitly indicate elements in the first value set for dynamic scheduling of an aperiodic SRS, so that flexibility of aperiodic SRS triggering can be improved, an SRS scheduling capacity is increased, and the probability of PDCCH congestion is reduced.

Figure 7:
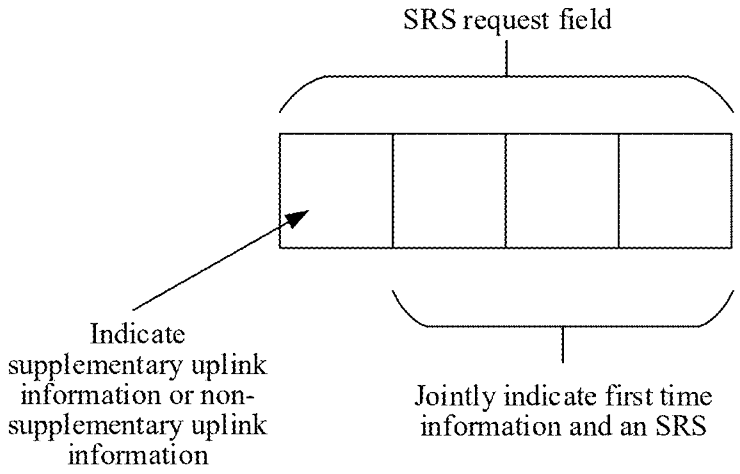
FIG. 7 is an example diagram of a first field according to Embodiment 5 of this application.

Embodiment 5: The first bit of the first field indicates supplementary uplink information or non-supplementary uplink information, and other bits in the first field other than the first bit indicate the first time information and the SRS. It is assumed that the first field includes four bits. Refer to a first field shown in FIG. 7. In FIG. 7, the first bit indicates supplementary uplink information or non-supplementary uplink information, and the last three bits jointly indicate the first time information and the SRS. For the joint indication of the last three bits, refer to Embodiment 2.

In Embodiment 5, a length of a field indicating SRS sending in DCI in which supplementary uplink information is configured is the same as a field indicating RS sending in DCI in which no supplementary uplink information is configured, so that processing complexity of the terminal device is reduced.

In correspondence to the methods provided in the foregoing method embodiments, an embodiment of this application further provides a corresponding apparatus. The apparatus includes corresponding modules configured to perform the foregoing embodiments. The modules may be software, hardware, or a combination of software and hardware.

Figure 8:
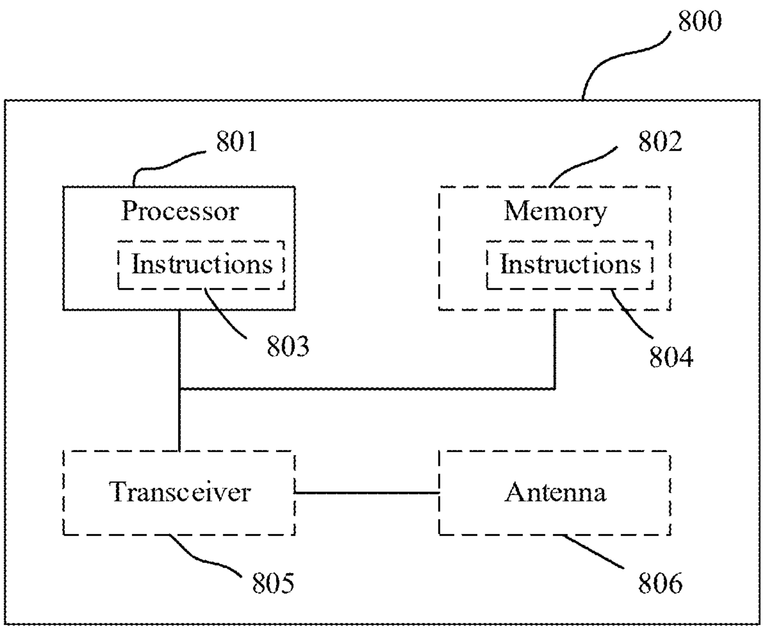
FIG. 8 is a schematic diagram of a structure of a communication apparatus according to an embodiment of this application.

FIG. 8 is a schematic diagram of a structure of a communication apparatus. A communication apparatus 800 may be a network device, or may be a terminal device, or may be a chip, a chip system, a processor, or the like that supports a network device in implementing the foregoing method, or may be a chip, a chip system, a processor, or the like that supports a terminal device in implementing the foregoing method. The apparatus may be configured to implement the methods described in the foregoing method embodiments. For details, refer to the descriptions in the foregoing method embodiments.

The communication apparatus 800 may include one or more processors 801. The processor 801 may also be referred to as a processing unit, a processing module, or the like, and may implement a specific control function. The processor 801 may be a general-purpose processor, a dedicated processor, or the like. The general-purpose processor may be, for example, a central processing unit, and the dedicated processor may be, for example, a baseband processor. The baseband processor may be configured to process a communication protocol and communication data. The central processing unit may be configured to: control the communication apparatus (for example, a base station, a baseband chip, a terminal, a terminal chip, a distributed unit (DU), or a central unit (CU)), execute a software program, and process data of the software program.

In an optional design, the processor 801 may store instructions 803, and the instructions 803 may be run by the processor 801, to enable the communication apparatus 800 to perform the methods described in the foregoing method embodiments.

In another optional design, the processor 801 may include a transceiver unit configured to implement receiving and sending functions. For example, the transceiver unit may be a transceiver circuit or an interface. The transceiver circuit, the interface, or an interface circuit configured to implement the receiving and sending functions may be separated, or may be integrated together. The transceiver circuit or the interface may be configured to read and write instructions, or the transceiver circuit or the interface may be configured to transmit a signal.

Optionally; the communication apparatus 800 may include one or more memories 802. The one or more memories 802 may store instructions 804. The instructions 804 may be run on the processor 801, to enable the communication apparatus 800 to perform the methods described in the foregoing method embodiments. Optionally, the memory 802 may further store data. Optionally, the processor 801 may also store instructions and/or data. The processor 801 and the memory 802 may be separately disposed, or may be integrated together. For example, a correspondence described in the foregoing method embodiments may be stored in the memory 802, or stored in the processor 801.

Optionally, the communication apparatus 800 may further include a transceiver 805 and/or an antenna 806. The transceiver 805 may be referred to as a transceiver unit, a transceiver device, a transceiver circuit, a transceiver apparatus, a transceiver module, or the like, and is configured to implement a transceiver function.

Optionally, in embodiments of this application, when the communication apparatus 800 is a terminal device, the communication apparatus 800 may include various function modules, configured to perform operation 201 to operation 203 in FIG. 2. When the communication apparatus 800 is a network device, the communication apparatus 800 may be configured to perform operation 201, operation 204, and operation 205 in FIG. 2.

The processor and the transceiver described in this application may be implemented on an integrated circuit (IC). The IC may include an analog IC, a radio frequency integrated circuit RFIC, a mixed-signal IC, an application-specific integrated circuit (ASIC), and the like. A printed circuit on a printed circuit board (PCB) may implement an IC.

The communication apparatus described in the foregoing embodiments may be a network device or a terminal device. However, a scope of the apparatus described in this application is not limited thereto, and a structure of the communication apparatus may not be limited to FIG. 8. The communication apparatus may be:

(1) an independent integrated circuit IC, a chip, or a chip system or subsystem; or (2) a receiver, a terminal, a cellular phone, a wireless device, a handheld device, a mobile unit, an in-vehicle device, a network device, a cloud device, an artificial intelligence device, a machine device, a home device, a medical device, an industrial device, or the like.

Figure 9:
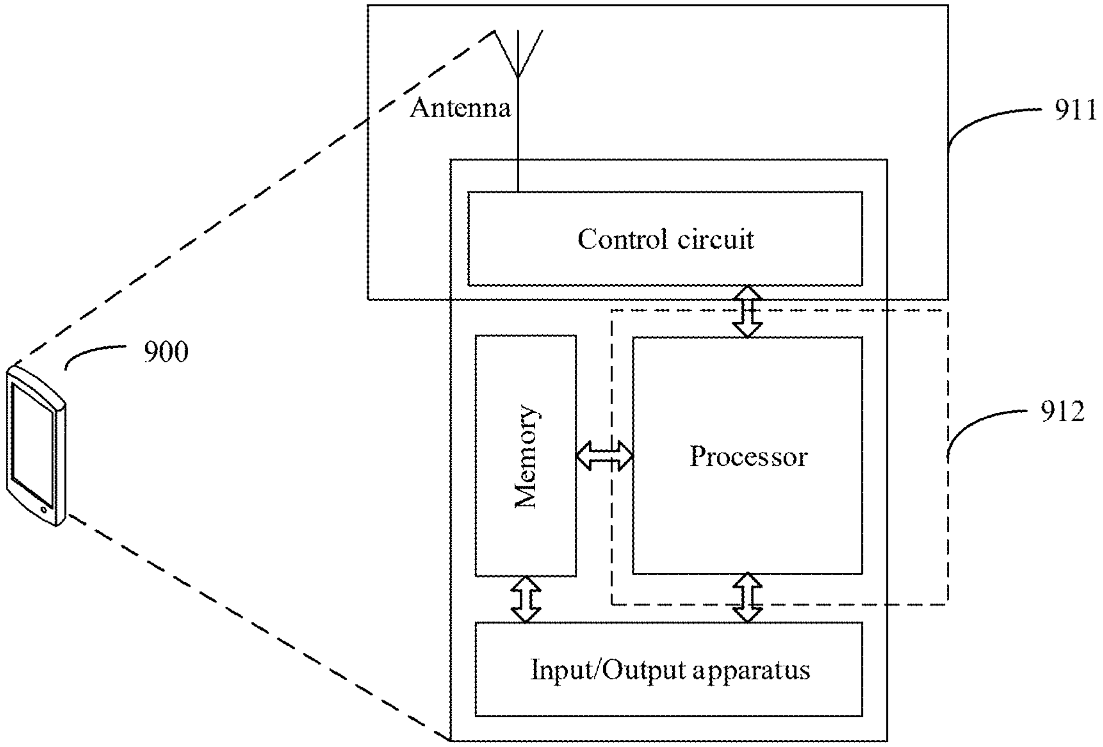
FIG. 9 is a schematic diagram of a structure of a terminal device according to an embodiment of this application.

FIG. 9 is a schematic diagram of a structure of a terminal device. For ease of description, FIG. 9 shows only main components of the terminal device. As shown in FIG. 9. the terminal device 900 includes a processor, a memory, a radio frequency circuit, an antenna, and an input/output apparatus. The processor is mainly configured to process a communication protocol and communication data, control the entire terminal, execute a software program, and process data of the software program. The memory is mainly configured to store the software program and the data. The radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to receive data input by a user and output data to the user.

After the terminal device is powered on, the processor may read thea software program in the memory, parse and execute instructions of the software program, and process the data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and sends the radio frequency signal to the outside in a form of an electromagnetic wave through the antenna. When data is sent to the terminal device, the radio frequency circuit receives a radio frequency signal through the antenna, further converts the radio frequency signal into a baseband signal, and outputs the baseband signal to the processor. The processor converts the baseband signal into data, and processes the data.

For ease of description, FIG. 9 shows only one memory and one processor. In an actual terminal device, there may be a plurality of processors and a plurality of memories. The memory may also be referred to as a storage medium, a storage device, or the like. This is not limited in embodiments of this application.

In an optional implementation, the processor may include a baseband processor and a central processing unit. The baseband processor is mainly configured to process a communication protocol and communication data. The central processing unit is mainly configured to control the entire terminal device, execute the software program, and process the data of the software program. The processor in FIG. 9 integrates functions of the baseband processor and the central processing unit. A person skilled in the art may understand that the baseband processor and the central processing unit may alternatively be processors independent of each other, and are interconnected by using a technology such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program, and the processor executes the software program to implement a baseband processing function.

In an example, the antenna and the control circuit that have receiving and sending functions may be considered as a transceiver module 911 of the terminal device 900, and the processor that has a processing function may be considered as a processing module 912 of the terminal device 900. As shown in FIG. 9, the terminal device 900 includes the transceiver module 911 and the processing module 912. The transceiver module may also be referred to as a transceiver, a transceiver device, a transceiver apparatus, a transceiver unit, or the like. Optionally, a component for implementing a receiving function in the transceiver module 911 may be considered as a receiving module, and a component for implementing a sending function in the transceiver module 911 may be considered as a sending module. In other words, the transceiver module 911 includes a receiving module and a sending module. For example, the receiving module may also be referred to as a receiver device, a receiver, a receiver circuit, a receiving unit, or the like, and the sending module may be referred to as a transmitter device, a transmitter, a transmitter circuit, a sending unit, or the like. Optionally, the receiving module and the sending module may be one integrated module, or may be a plurality of independent modules. The receiving module and the sending module may be located at one geographical location, or may be scattered at a plurality of geographical locations.

Figure 10:
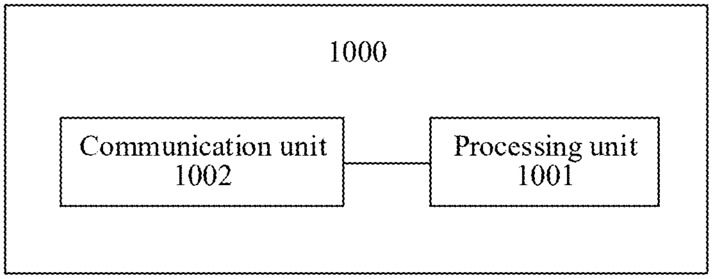
FIG. 10 is a schematic diagram of another structure of a communication apparatus according to an embodiment of this application.

As shown in FIG. 10, another embodiment of this application provides a communication apparatus 1000. The apparatus may be a terminal device: or may be a component (for example, an integrated circuit or a chip) of the terminal device. Alternatively, the apparatus may be a network device, or may be a component (for example, an integrated circuit or a chip) of the network device. Alternatively, the apparatus may be another communication module configured to implement the methods in the method embodiments of this application. The communication apparatus 1000 may include a processing unit 1001 (or referred to as a processing module). Optionally, the apparatus may further include a communication unit 1002 (or referred to as a transceiver unit, a receiving unit, and/or a sending unit). Optionally, the apparatus may further include a storage unit (or referred to as a storage module).

In a possible design, one or more units in FIG. 10 may be implemented by one or more processors, or implemented by one or more processors and memories, or implemented by one or more processors and transceivers, or implemented by one or more processors, memories, and transceivers. This is not limited in embodiments of this application. The processor, the memory, and the transceiver may be separately disposed, or may be integrated.

The communication apparatus 1000 has functions of implementing the terminal device described in embodiments of this application. For example, the communication apparatus 1000 includes modules, units, or means corresponding to the operations related to the terminal device that are described in embodiments of this application and performed by the terminal device. The functions, units, or means may be implemented through software or hardware, or may be implemented through hardware executing corresponding software, or may be implemented through a combination of software and hardware. For details, refer to the corresponding descriptions in the foregoing corresponding method embodiments. Alternatively, the communication apparatus 1000 has functions of implementing the network device described in embodiments of this application. For example, the communication apparatus 1000 includes modules, units, or means corresponding to the operations related to the network device that are described in embodiments of this application and performed by the network device. The functions, units, or means may be implemented through software or hardware, or may be implemented through hardware executing corresponding software, or may be implemented by a combination of software and hardware. For details, refer to the corresponding descriptions in the foregoing corresponding method embodiments.

Optionally, the modules in the communication apparatus 1000 in embodiments of this application may be configured to perform the method described in FIG. 2 in embodiments of this application, or may be configured to perform a method in which the methods described in the foregoing two or more figures are combined.

In a possible design, the communication apparatus 1000 is a network device, and may include a communication unit 1002 and a processing unit 1001. The communication unit 1002 may be configured to perform operation 201 and operation 206 in the embodiment shown in FIG. 2. The processing unit 1001 may be configured to perform operation 205 in the embodiment shown in FIG. 2.

In a possible design, the communication apparatus 1000 is a terminal device, and may include a communication unit 1002 and a processing unit 1001. The communication unit 1002 may be configured to perform operation 201 and operation 204 in the embodiment shown in FIG. 2. The processing unit 1001 may be configured to perform operation 202 and operation 203 in the embodiment shown in FIG. 2.

It may be understood that, in some scenarios, some optional features in embodiments of this application may be independently implemented without depending on another feature, for example, a solution on which the optional features are currently based, to resolve a corresponding technical problem and achieve corresponding effect. Alternatively, in some scenarios, the optional features may be combined with other features based on requirements. Correspondingly, the apparatus provided in embodiments of this application may also correspondingly implement these features or functions. Details are not described herein.

A person skilled in the art may further understand that various illustrative logical blocks and operations operation that are listed in embodiments of this application may be implemented through electronic hardware, computer software, or a combination thereof. Whether the functions are implemented through hardware or software depends on particular applications and a design requirement of an entire system. A person skilled in the art may use various methods to implement the functions for corresponding applications, but it should not be considered that the implementation goes beyond the scope of embodiments of this application.

It may be understood that, the processor in embodiments of this application may be an integrated circuit chip, and has a signal processing capability. In an implementation process. operations in the foregoing method embodiments may be implemented by a hardware integrated logic circuit in the processor, or by instructions in a form of software. The processor may be a general-purpose processor, a digital signal processor (DSP), an application-specific integrated circuit (ASIC), a field programmable gate array (FPGA), or another programmable logic device, discrete gate or transistor logic device, or discrete hardware component.

The solutions described in embodiments of this application may be implemented in various manners. For example, the technologies may be implemented by hardware, software, or a combination thereof. For hardware implementation, a processing unit configured to execute these technologies at a communication apparatus (for example, a base station, a terminal, a network entity, or a chip) may be implemented in one or more general-purpose processors, a DSP, a digital signal processing device, an ASIC, a programmable logic device, an FPGA, or another programmable logic apparatus, discrete gate or transistor logic, discrete hardware component, or any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors and a digital signal processor core, or any other similar configuration.

It may be understood that the memory in embodiments of this application may be a volatile memory or a non-volatile memory, or may include a volatile memory and a non-volatile memory: The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example, but not limitation, many forms of RAMs are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the systems and methods described in this specification includes but is not limited to memories of these and any other appropriate types.

It should be understood that, an "embodiment" mentioned throughout this specification means that particular features, structures, or characteristics related to this embodiment are included in at least one embodiment of this application. Therefore, embodiments in the entire specification do not necessarily refer to a same embodiment. In addition, these particular features, structures, or characteristics may be combined in one or more embodiments in any appropriate manner. It may be understood that sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

The correspondences shown in the tables in embodiments of this application may be configured, or may be predefined. Values of the information in the tables are merely examples, and other values may be configured. This is not limited in this application. When a correspondence between the information and the parameters is configured, not all the correspondences shown in the tables need to be configured. For example, in the tables in embodiments of this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in embodiments of this application may be understood as "define", "define in advance", "store", "pre-store", "pre-negotiate", "pre-configure", "build", or "pre-program".

A person of ordinary skill in the art may understand that units and algorithm operations in the examples described with reference to embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person of ordinary skill in the art may understand that, for the purpose of convenient and brief description, for a detailed working process of the foregoing system, apparatus, and unit, refer to a corresponding process in the foregoing method embodiments. Details are not described herein again.

It may be understood that the system, apparatus, and method described in embodiments of this application may alternatively be implemented in another manner. For example, the described apparatus embodiment is merely an example. For example, division into the units is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of embodiments of this application essentially, or the part contributing to the conventional technology; or some of the technical solutions may be implemented in a form of a software product. The computer software product is stored in a storage medium, and includes several instructions for instructing a computer device (which may be a personal computer, a server, or a network device) to perform all or some of the operations of the methods described in embodiments of this application. The storage medium includes any medium that can store program code, such as a USB flash drive, a removable hard disk, a read-only memory (ROM), a random access memory (RAM), a magnetic disk, or an optical disc.

For same or similar parts in embodiments of this application, refer to each other. In embodiments of this application and the implementations/implementing methods/implementation methods in the embodiments, unless otherwise specified or logically conflicting, terms and/or descriptions between different embodiments and between the implementations/implementing methods/implementation methods in the embodiments are consistent and may be mutually referenced, and technical features in different embodiments and implementations/implementing methods/implementation methods in the embodiments may be combined to form new embodiments, implementations, implementing methods, or implementation methods according to internal logical relationships. The foregoing implementations of this application are not intended to limit the protection scope of this application.

The foregoing descriptions are merely specific implementations of this application, but are not intended to limit the protection scope of this application. Any variation or replacement readily figured out by a person skilled in the art within the technical scope disclosed in embodiments of this application shall fall within the protection scope of this application.

What is claimed is:

1. A reference signal (RS) sending method applied to a communication apparatus, the method comprising:

obtaining downlink control information (DCI);

determining first time information based on the DCI, wherein the DCI comprises a time indication field, wherein the time indication field and a first time offset are used to determine the first time information, wherein a value indicated in the time indication field is a predefined set or is comprised in a second value set configured by using second higher layer configuration information, and wherein the first time offset is predefined or is configured by using third higher layer configuration information;

determining, based on the first time information and a time unit in which the DCI is located, a time unit for sending an RS; and sending the RS in the determined time unit for sending the RS.

2. The method according to claim 1, wherein the DCI further comprises an RS request field for determining the RS to be sent.

3. The method according to claim 1, wherein the second value set comprises one or more numerical values in {0, 1, 2, 3, 4, 5, 6, 7}.

4. The method according to claim 1, wherein a value of at least one element in the second value set is greater than −4 and less than 5; or a value of at least one element in the second value set is greater than 0 and less than 7; or the second value set is related to slot format information.

5. A communication apparatus comprising:

at least one processor;

a memory configured to store a computer program that, when executed by the at least one processor, causes the communication apparatus to:

obtain downlink control information (DCI);

determine first time information based on the DCI, wherein the DCI comprises a time indication field, wherein the time indication field and a first time offset are used to determine the first time information, wherein a value indicated in the time indication field is a predefined set or is comprised in a second value set configured by using second higher layer configuration information, and wherein the first time offset is predefined or is configured by using third higher layer configuration information;

determine, based on the first time information and a time unit in which the DCI is located, a time unit for sending a reference signal (RS); and send the RS in the determined time unit for sending the RS.

6. The apparatus according to claim 5, wherein the DCI further comprises an RS request field for determining the RS to be sent.

7. The apparatus according to claim 5, wherein the second value set comprises one or more numerical values in {0, 1, 2, 3, 4, 5, 6, 7}.

8. The apparatus according to claim 5, wherein a value of at least one element in the second value set is greater than −4 and less than 5; or a value of at least one element in the second value set is greater than 0 and less than 7; or the second value set is related to slot format information.

9. A non-transitory computer-readable storage medium storing computer instructions, that when executed by a communication device, cause the communication device to perform at least the following operations:

obtaining downlink control information (DCI);

determining first time information based on the DCI, wherein the DCI comprises a time indication field, wherein the time indication field and a first time offset are used to determine the first time information, wherein a value indicated in the time indication field is a predefined set or is comprised in a second value set configured by using second higher layer configuration information, and wherein the first time offset is predefined or is configured by using third higher layer configuration information;

determining, based on the first time information and a time unit in which the DCI is located, a time unit for sending a reference signal (RS); and sending the RS in the determined time unit for sending the RS.

10. The non-transitory computer-readable storage medium according to claim 9, wherein the DCI further comprises an RS request field for determining the RS to be sent.

11. The non-transitory computer-readable storage medium according to claim 9, wherein the second value set comprises one or more numerical values in {0, 1, 2, 3, 4, 5, 6, 7}.

12. The non-transitory computer-readable storage medium according to claim 9, wherein a value of at least one element in the second value set is greater than −4 and less than 5; or a value of at least one element in the second value set is greater than 0 and less than 7; or the second value set is related to slot format information.

13. A communication chip comprising at least one processor, wherein the at least one processor is coupled with at least one memory that stores computer instructions, that when executed by the at least one processor, cause the communications chip to perform at least the following operations:

obtaining downlink control information (DCI);

determining first time information based on the DCI, wherein the DCI comprises a time indication field, wherein the time indication field and a first time offset are used to determine the first time information, wherein a value indicated in the time indication field is a predefined set or is comprised in a second value set configured by using second higher layer configuration information, and wherein the first time offset is predefined or is configured by using third higher layer configuration information;

determining, based on the first time information and a time unit in which the DCI is located, a time unit for sending a reference signal (RS); and sending the RS in the determined time unit for sending the RS.

14. The communication chip according to claim 13, wherein the DCI further comprises an RS request field, wherein the RS request filed is used to determine the RS to be sent.

15. The communication chip according to claim 13, wherein the second value set comprises one or more numerical values in {0, 1, 2, 3, 4, 5, 6, 7}.

16. The communication chip according to claim 13, wherein a value of at least one element in the second value set is greater than −4 and less than 5; or a value of at least one element in the second value set is greater than 0 and less than 7; or the second value set is related to slot format information.

* * * * *